(12) United States Patent
Obermeyer et al.

(10) Patent No.: US 11,300,093 B2
(45) Date of Patent: Apr. 12, 2022

(54) REVERSIBLE PUMP-TURBINE INSTALLATION

(71) Applicant: Henry K. Obermeyer, Wellington, CO (US)

(72) Inventors: Henry K. Obermeyer, Wellington, CO (US); Claudiu M. Iavornic, Fort Collins, CO (US); Grant Quinn Baker, Arlington, VA (US)

(73) Assignee: Henry Obermeyer, Wellington, CO (US)

( * ) Notice: Subject to any disclaimer, the term of this patent is extended or adjusted under 35 U.S.C. 154(b) by 0 days.

(21) Appl. No.: 16/322,185

(22) PCT Filed: Apr. 30, 2018

(86) PCT No.: PCT/US2018/030310
§ 371 (c)(1),
(2) Date: Jan. 31, 2019

(87) PCT Pub. No.: WO2019/005286
PCT Pub. Date: Jan. 3, 2019

(65) Prior Publication Data
US 2019/0186458 A1    Jun. 20, 2019

Related U.S. Application Data

(63) Continuation-in-part of application No. PCT/US2017/048769, filed on Aug. 26, 2017.
(Continued)

(51) Int. Cl.
*F03B 13/06* (2006.01)
*E02B 9/00* (2006.01)
(Continued)

(52) U.S. Cl.
CPC ............ *F03B 13/06* (2013.01); *E02B 9/00* (2013.01); *E02B 9/06* (2013.01); *F03B 3/103* (2013.01); *F03B 13/10* (2013.01); *F05B 2220/32* (2013.01)

(58) Field of Classification Search
CPC .. F03B 13/06; F03B 3/103; E02B 9/06; E02B 9/00; F05B 2220/32; Y02E 10/22; Y02E 10/226
(Continued)

(56) References Cited

U.S. PATENT DOCUMENTS 1,757,926 A * 5/1930 Moody ................ E02B 9/00
                                                                    405/78
2,022,975 A * 12/1935 Pfau .................. F03B 15/12
                                                                    137/505.11

(Continued)

FOREIGN PATENT DOCUMENTS

CA          1289869      10/1991
CN       103759069 A     4/2014
(Continued)

OTHER PUBLICATIONS

International Application No. PCT/US2017/048769; International Search Report dated Nov. 20, 2017.
(Continued)

*Primary Examiner* — Dustin T Nguyen

(57) ABSTRACT

The present invention is a reversible pump-turbine installation positioned in a vertical borehole instead of in a conventional underground powerhouse or deep concrete powerhouse. The required plant cavitation coefficient may be achieved by simply boring a vertical borehole to the required depth rather than routing the water flow to and from a deeply buried powerhouse. A pneumatically controlled pressure relief valve may be incorporated into this invention.

6 Claims, 45 Drawing Sheets

Related U.S. Application Data

(60) Provisional application No. 62/527,010, filed on Jun. 29, 2017, provisional application No. 62/664,849, filed on Apr. 30, 2018.

(51) Int. Cl.
  *F03B 3/10* (2006.01)
  *E02B 9/06* (2006.01)
  *F03B 13/10* (2006.01)

(58) Field of Classification Search
  USPC .................................. 60/398; 290/54, 52, 43
  See application file for complete search history.

(56) References Cited

U.S. PATENT DOCUMENTS

| | | | |
|---|---|---|---|
| 2,246,472 A | 6/1941 | Sharp | |
| 2,608,663 A * | 8/1952 | Wales | F03B 13/02 290/52 |
| 3,163,118 A | 12/1964 | Baumann | |
| 3,276,461 A * | 10/1966 | Kerensky | F03B 15/08 415/22 |
| 3,398,932 A * | 8/1968 | Koeller | F03B 15/00 415/47 |
| 3,398,935 A * | 8/1968 | Livesey | B01F 13/0272 366/101 |
| 3,614,268 A | 10/1971 | Merenda | |
| 3,794,456 A | 2/1974 | Jelusic | |
| 3,810,717 A | 5/1974 | Rakcevic | |
| 3,867,059 A * | 2/1975 | Fauconnet | F03B 13/06 415/164 |
| 4,004,605 A * | 1/1977 | Rakcevic | F16K 17/32 137/219 |
| 4,008,010 A | 2/1977 | Fauconnet | |
| 4,214,104 A | 7/1980 | Pistorius | |
| 4,217,077 A | 8/1980 | Brear | |
| 4,272,686 A | 6/1981 | Suzuki | |
| 4,275,989 A | 6/1981 | Gutierrez Atencio | |
| 4,416,328 A | 11/1983 | Baski | |
| 4,431,446 A | 2/1984 | Yamamoto et al. | |
| 4,441,029 A | 4/1984 | Kao | |
| 4,496,845 A | 1/1985 | Ensign et al. | |
| 4,538,957 A | 9/1985 | Yamagata et al. | |
| 4,804,855 A | 2/1989 | Obermeyer | |
| 5,261,787 A * | 11/1993 | Morgunov | F03B 3/02 415/208.1 |
| 5,561,358 A | 10/1996 | Kuwabara et al. | |
| 6,250,887 B1 | 6/2001 | Kuwabara et al. | |
| 6,311,770 B1 | 11/2001 | Mullis | |
| 6,405,994 B1 * | 6/2002 | Chen | F16K 7/10 137/625.3 |
| 6,820,333 B2 | 11/2004 | Shimmei et al. | |
| 7,002,955 B1 | 2/2006 | Davis | |
| 7,092,795 B2 | 8/2006 | Kuwabara | |
| 7,837,450 B2 | 11/2010 | Moreland | |
| 8,072,089 B2 * | 12/2011 | Krouse | F03B 13/08 290/43 |
| 8,193,652 B2 | 6/2012 | Paoli | |
| 8,215,104 B2 | 7/2012 | Riley | |
| 8,485,250 B1 | 7/2013 | Rose | |
| 8,536,723 B2 | 9/2013 | Roos | |
| 8,823,195 B2 | 11/2014 | Legacy | |
| 9,059,605 B2 * | 6/2015 | Murray | H02J 15/003 |
| 9,109,571 B2 | 8/2015 | Sepp et al. | |
| 9,494,164 B2 | 11/2016 | Baski | |
| 9,683,540 B2 | 6/2017 | Winkler et al. | |
| 2013/0045086 A1* | 2/2013 | Stummer | F03B 3/10 415/148 |
| 2015/0098793 A1* | 4/2015 | Baski | E21B 43/126 415/1 |
| 2016/0341173 A1* | 11/2016 | Coulon | F03B 3/106 |
| 2017/0023008 A1 | 1/2017 | Kadowaki | |
| 2018/0040226 A1 | 2/2018 | Zhang et al. | |

FOREIGN PATENT DOCUMENTS

| | | | | |
|---|---|---|---|---|
| IL | 98439 A | | 6/1994 | |
| KR | 20040064666 A | | 7/2004 | |
| RU | 54379 | * | 6/2006 | ............ Y02E 10/22 |
| RU | 54379 U1 | | 6/2006 | |
| WO | 2012024356 A1 | | 2/2012 | |
| WO | 2013132098 A2 | | 12/2013 | |
| WO | 2017093016 A1 | | 8/2017 | |

OTHER PUBLICATIONS

International Application No. PCT/US2017/048769; Written Opinion of the International Searching Authority dated Nov. 20, 2017.
International Application No. PCT/US2018/030310; International Search Report dated Jul. 26, 2018.
International Application No. PCT/US2018/030310; Written Opinion of the International Searching Authority dated Jul. 26, 2018.
Catalog entitled 'Goulds Pumps—Vertical Turbine Pumps' (ITT Corporation) 2012. pp. 11 & 12. 1-18. [Retrieved from the internet].
Witt A, et al. Evaluation of the Feasibility and Viability of Modular Pumped Storage Hydro (m-PSH) in the United States, Sep. 2015.
Erickson, B, Future Directions in Wind Power Conversion Electronics, ECE Department, University of Colorado, Boulder, Downloaded Apr. 28, 2018.
ABB VM1 Medium voltage vacuum circuit breakers with magnetic drive 12 . . . 24 kV-630 . . . 4000 A-16 . . . 50 kA, Brochure, copyright 2018.
Shubbra (MIEEE, LMIETE), MATLAB/Simulink Based Model for 25 kV AC Electric Traction Drive, International Journal of Engineering Research & Technology (IJERT) ISSN: 2278-0181IJERTV3IS051344, vol. 3 Issue 5, May 2014.
Wang, D; Yang, J; Chen, Z; Mao, C; Lu, J, A Transformerless Medium Voltage Multiphase Motor Drive System, Energies 2016, 9, 323; doi:10.3390/en9050323, Apr. 27, 2016.
Allen-Bradley, Brochure, Understanding Regeneration, Publication 1336R-WP002A-EN-P—Feb. 2001.
Getzlaff, Fundamentals of Magnetics, Copyright 2004.
Original Faesch & Piccard Design of Wheel-pit for Power House Number One.
Maharjan, N; Chitrakar, S; Koirala, R, Design of Reversible Pump Turbine for its prospective application in Nepal, International Journal of Scientific and Research Publications, vol. 4, Issue 7, Jul. 2014.
Five in focus—new pump storage schemes, Dec. 2010.
Ingram, E, Worldwide Pumped Storage Activity, Sep. 2010.
Beyer, T, Goldisthal Pumped-Storage Plant: More than Power Production, Hydrowprld.com, Mar. 2007.
Estimating Reversible Pump-Turbine Characteristics, US Dept of the Interior Bureau of Reclamation, A Water Resources Technical Publication, Engineering Monograph No. 19, Dec. 1977.
Analysis of a Static Start-up Control Strategy for Pumped Storage Power Plant Unit, Physics Procedia, vol. 24, 2012.
HydraForce-RVCV56-20—Relief Direct Acting, Anti-cavitation, 2013.
Budnis, A, Using Pumps as Power Recovery Turbines, WaterWorld.
McLyman, W T, Transformer and Inductor Design Handbook—Copyright © 2004.
Eagle Mountain Pumped Storage Project No. 13123 Final License Application, vol. 1 of 6, Exhibits A and B, Submitted to: Federal Energy Regulatory Commission, Submitted by: Eagle Crest Energy Company, Jun. 2009.
Pumped storage machines, Reversible pump turbines, Ternary sets and Motor-generators, Voith Hydro Holding GmbH & Co. KG.
Levett, D; Frank, T, Cascade Topology-Based Medium Voltage Motor Drives: Operation Theory and Silicon Options; Jul. 2017.
Yang, X; Patterson, D, Hudgins, J, Digital Communication @ University of Nebraska, Lincoln, Permanent Magnet Generator design and Control for LargeWind Turbines, 2012.
GE Power Generators, Brochure, Nov. 2015.
Brochure, Edition Jan. 15, 2018, Infineon Technologies AG.
Infineon, AN2011-05 Industrial IGBT Modules Explanation of Technical Information, V1.2 Nov. 2015.

(56) References Cited

OTHER PUBLICATIONS

Brochure, DC to AC Converters, Introduction to Voltage Source Inverters, Version 2 EE IIT, Kharagpur 14.
Medium Voltage Switchgear & Products on the MV Network, Medium Voltage Switchgear & Products on the MV Network—Catalogue 2015.
MV7000 Reliable, high performance medium voltage drive, GE Power Conversion 2013.
Challenges and Opportunities for New Pumped Storage Development, White Paper, NHA Pumped Storage Development Council Challenges and Opportunities for New Pumped Storage Development.
Yaskawa, MV1000 Specification Guide, (Rev 1) Sep. 23, 2013.
SINAMICS Medium Voltage Drives, Seimens, Drives or Every Demand, Brochure, Published by Siemens AG 2016 Process Industries and Drives.
Moran, S, Multi-Megawatt Motor Drive Technology, Mar. 30, 2009.
Toshiba Adjustable Speed Drives, Brochure, 2014.
Van der Merwe, D, Protection at a pumped storage station uses static frequency starting, Energize, May 2013.
U.S. Appl. No. 62/664,849, filed Apr. 20, 2018.
U.S. Appl. No. 62/527,010, filed Jun. 29, 2017.
European Search Report from parallel application EP 18 82 3779 dated Nov. 23, 2020.
Office Action from parallel application CN 201880003305.4 dated Jun. 24, 2021.
Office Action from parallel application IN 201917016740 dated Oct. 1, 2021.
EPO decision on priority in parallel application EP App. No. 18823779.6-1005 dated Jan. 22, 2020.

\* cited by examiner

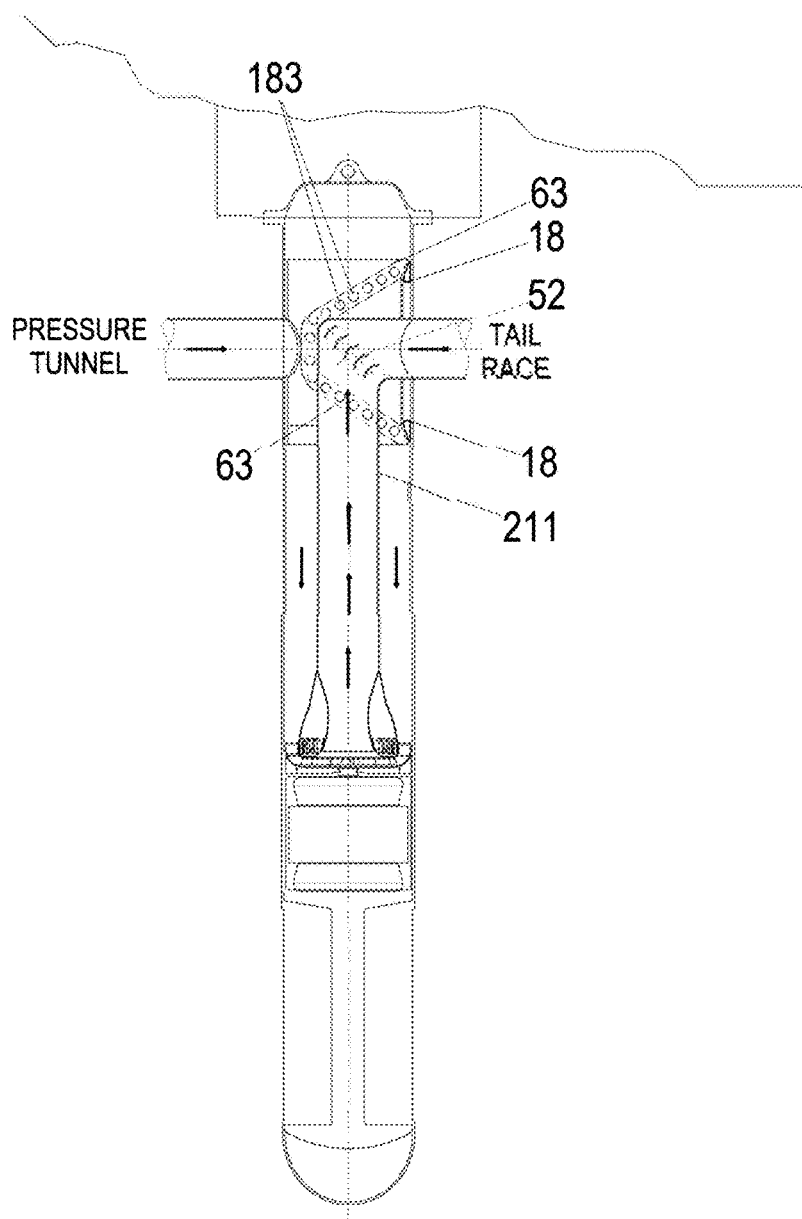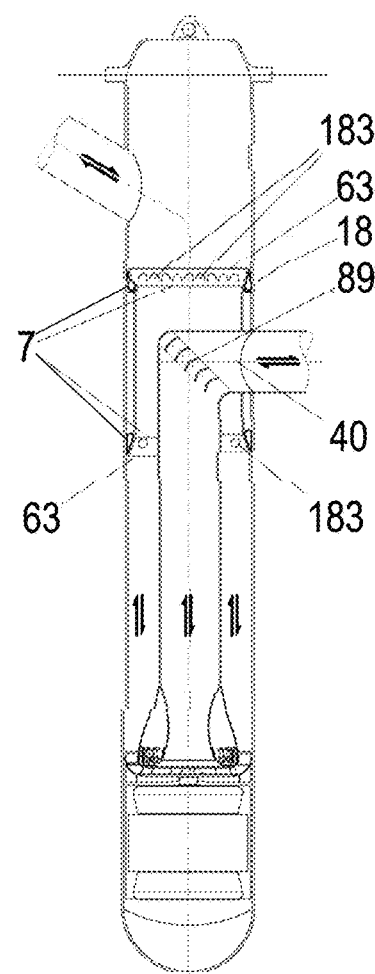
Fig. 15
Fig. 16

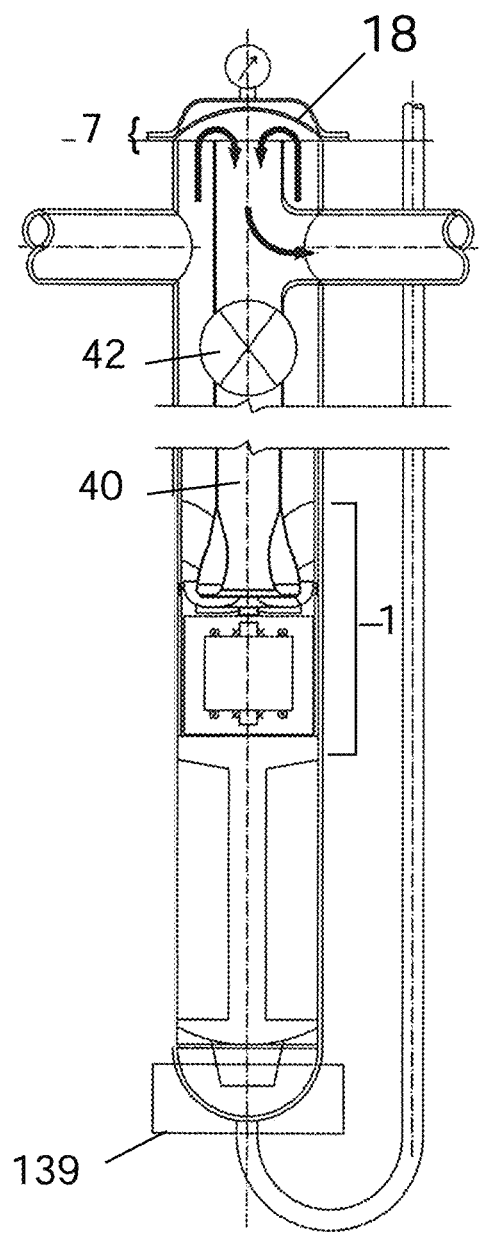
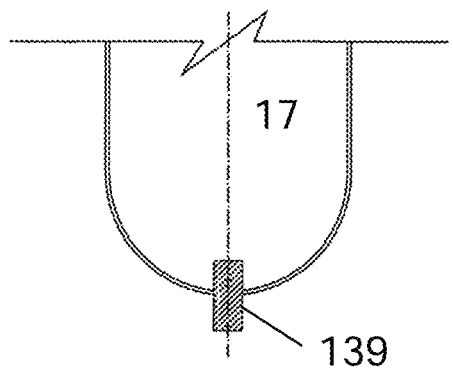
Fig 22a
Fig. 22b

REVERSIBLE PUMP-TURBINE INSTALLATION

This application is the United States National Stage of International Application No. PCT/US2018/030310, filed Apr. 30, 2018, which is a Continuation in Part of International Application No. PCT/US2017/048769, filed Aug. 26, 2017, and which also claims benefit of and priority to U.S. Provisional Application No. 62/664,849 filed Apr. 20, 2018 and U.S. Provisional Application No. 62/527,010, filed Jun. 29, 2017. Each said application is incorporated herein by reference.

This invention was made with government support under DE-EE0008014 awarded by the Department of Energy. The government has certain rights in the invention.

FIELD OF THE INVENTION

The present invention relates to reversible pump-turbines used for storage of electrical energy. Conventional pumped storage facilities as shown in FIG. 1 generally use an underground powerhouse to provide sufficient absolute pressure at the runner to prevent destructive cavitation. The elevation of the runner may be 100 meters below tailwater, for example. Constructing and maintaining such an underground facility is expensive and the expense does not decrease in proportion to size in the case of smaller facilities. There are therefore very few pumped storage facilities of less than 100 MW in North America. A typical conventional pump-turbine sectional elevation is shown in FIG. 1 $b$. The prior art pump-turbine flow path with a 90 degree turn in the meridional plane is illustrated in FIG. 1$c$, this being similar to the flow path in the meridional plane of a conventional Francis turbine. The present invention relates to single purpose turbines and pumps as well as to reversible pump-turbines. The lower portion of FIG. 2 shows a conventional impeller and diffuser configuration (in the meridional plane), where the acceleration imparted by the runner (impeller) to the fluid is outward and downward, this results in an unnecessarily small runner tip diameter compared to the maximum water passageway diameter that in this case occurs in the diffuser. This unnecessarily small diameter results in limited head differential across each stage and in turn results in more stages and lower overall efficiency.

SUMMARY OF THE INVENTION

The present invention establishes the required plant cavitation coefficient by positioning reversible pump-turbines with motor-generators, generally well below tailwater level in a generally vertical borehole. The term "borehole", rather than "shaft", is used herein to avoid confusion with the rotating shaft of the pump-turbine located therein.

Conventional pumped storage facilities position the runner well below tailwater elevation to suppress cavitation while keeping unit power and specific speed high. The critical cavitation coefficient for reversible pump-turbines is higher than it is for either turbines or pumps because the hydraulic profiles are a compromise between pumping and generating and are optimized for neither. Positioning of the runner below tailwater has heretofore required a deep and expensive excavation regardless of machine size and rating. The expense of excavation and underground construction has been cost prohibitive for small installations, of less than 100 MW, for example. Sites suitable for large installations are limited by geology, geography, competing land uses, and adequate transmission lines. Many suitable smaller scale sites exist, but existing reversible pump-turbines, even if scaled down in size and rating, still require excavation and construction costs that are prohibitive.

The proposed configuration utilizes a simple and inexpensive borehole of perhaps 1 to 3 meters in diameter to position a high specific output reversible pump-turbine sufficiently below tailwater elevation to suppress cavitation. Such boreholes are routinely drilled as a commodity construction service for reasonable prices. A steel liner and conduits for hoisting water, electrical and control cables, for example, may be grouted in place within the borehole. Pump-turbines adapted to this type of installation may be configured as single stage machines or may be configured as multi-stage machines utilizing specially configured "diffuser bowls" similar in function to those used on multi-stage submersible pumps. These pump-turbines would not normally use conventional scroll cases. As such, stages of these pump-turbines may be stackable to allow standard hydraulic designs to be used over a wide range of head conditions. The use of standard pump-turbine stages is further facilitated by the fact that the required plant cavitation coefficient can be achieved by simply establishing the required vertical borehole depth. Compared to conventional underground powerhouse pump-turbine installations, there is a less frequent need to design and manufacture site specific machinery and there is no need carry the penstock nor tailrace conduit to extraordinary depths, which would be cost prohibitive in conjunction with small pumped hydro installations at most locations. The use of standard components results in increased quantities of like parts at reduced cost. Reduced costs in turn enable a greater number of projects to be built with increased part quantities.

Water flow to and from the reversible pump-turbine may be through coaxial penstocks positioned in the borehole above the pump-turbine assembly. The associated motor-generator, which can act as a motor or generator as conditions demand, may be submersible and in certain preferred embodiments located below the pump-turbine(s). Locating the motor-generator below the pump turbines allows for a larger diameter, and therefore more economical, motor-generator for a given borehole size. Allocating substantially all of the borehole cross sectional area to water conveyance (up and down), rather than to space for the motor-generator, allows for the maximum power rating for a given diameter of borehole.

The motor-generator may alternatively be located outside of the water passageways and connected to the runner with a shaft. Such an arrangement may be cheaper than providing an underground powerhouse large enough to incorporate a scroll case, while allowing the use of a readily available air-cooled motor-generator.

In a preferred embodiment, a removable manifold may be used to connect the inner pipe to tailwater and connect the outer pipe to the penstock leading to headwater. It is generally more efficient to connect the smaller diameter pump inlet/turbine outlet with the smaller of the coaxial pipes while connecting the larger pump outlet/turbine inlet with the larger of the two coaxial pipes. Alternative embodiments of this invention may utilize another arrangement as may be the case when multiple pump turbines might be installed, on a bulkhead, for example, in a common borehole. The removable manifold may include an integral pneumatically controlled pressure relief valve. This integral pressure relief valve will itself reduce civil works costs by eliminating the need for a surge shaft and by reducing penstock surge pressure and penstock cost. Additionally, or alternatively, an air cushion may be left under the cover of the borehole. Removal of the manifold allows removal of the machinery from the borehole. Dedicated hoisting equipment will facilitate installation, service, and maintenance without the need for confined space work. A water pressure actuated piston attached to the bottom of the reversible pump turbine may be used for raising and lowering. A spacer between the piston and the machine may be used to allow the machine to be raised entirely clear of the borehole.

Variable speed operation is facilitated by the ready availability of power control electronics developed for the wind industry. As in the case of wind turbine power converters, full power converters may be used in conjunction with motor-generators (e.g., permanent magnet motor-generators) and partial power converters may be used in conjunction with (generally larger) doubly fed induction generators.

The borehole in which the reversible pump-turbine is installed may include provision for delivery of pressurized water to the bottom of the borehole, through a conduit 207 separate from the main borehole to hydraulically hoist the equipment for maintenance and repair and to controllably lower the equipment into operating position. The electrical power connection is preferably configured to automatically engage when the machine is lowered and to automatically disengage when the machine is raised. Such a connector may use conventional "wet mate" marine electrical connector technology or may be use a combination of compressed gas, insulating oil and inflatable bladders, for example, to establish robust electrical connections isolated from ground potential.

The borehole in which the equipment is located may terminate at the upper portal, the lower portal or at any convenient intermediate location. In the case of installation in conjunction with an existing pipeline, the vertical borehole may be located according to desired pressure profiles resulting from operation, load rejection, and other considerations. The borehole cover may incorporate a pressure relief valve and may be used to cap off a surge shaft containing air.

Multiple machines may be installed in a single borehole, on a common bulkhead, for example. The reversible pump turbines in accordance with the present invention may be used in conjunction with Pelton turbines, for example to facilitate generation at low power levels if required. The reversible pump turbines may be used in conjunction with off-stream seasonal storage reservoirs, where their primary purpose may be to raise water to the storage reservoir during high flow periods and to return water while recovering energy when stored water is required downstream.

In accordance with certain embodiments of this invention, gas pressure balanced pressure relief valves may be used to limit overpressure from water hammer.

An elbow with actuatable seals may be used in order to connect the draft tube to the tail race during operation. Inflatable bladders may be used to seal the elbow in its operating position while allowing it to move freely during hoisting and lowering operations. Inflatable bladders or supports may also be used to fix the machine into position during operation and to release it to allow it to be raised for maintenance.

In accordance with a further aspect of the invention a reversible pump turbine runner or pump impeller is provided that imparts to the flow an upward velocity component. This upward velocity component allows the flow to proceed directly up through the diffuser or a guide vane-diffuser combination in the case of a reversible pump-turbine, or directly to a diffuser (stator) stage in the case of a multi-stage pump, while maximizing the ratio of impeller tip diameter to maximum water passageway diameter. In the case of the present invention this ratio may be 1.00. This maximizes the head per stage and allows a greater head to be achieved with a single stage machine. FIGS. 19a, 19b, and 19c illustrate the flow in the meridional plane as well as the X-shaped appearance of the impeller blades when viewed toward the trailing edge.

BRIEF DESCRIPTION OF THE DRAWINGS

FIG. 15 illustrates a pumped storage installation in accordance with the present invention including a tailrace connection elbow.

FIG. 16 illustrates a pumped storage installation in accordance with the present invention including a tailrace connection elbow and a penstock entering the borehole at an elevation higher than the tailrace tunnel.

FIG. 19b shows a sectional view from perspective A-A of FIG. 19a.

FIG. 22a is a pump turbine installation including a pressure relief valve 7. FIG. 22a also shows shutoff valve 42.

FIG. 22b is a schematic of a torque key positioned at the bottom of a borehole for the purpose of preventing unintended rotation of the pump-turbine.

DETAILED DESCRIPTION OF THE PREFERRED EMBODIMENTS

Figure 1A:
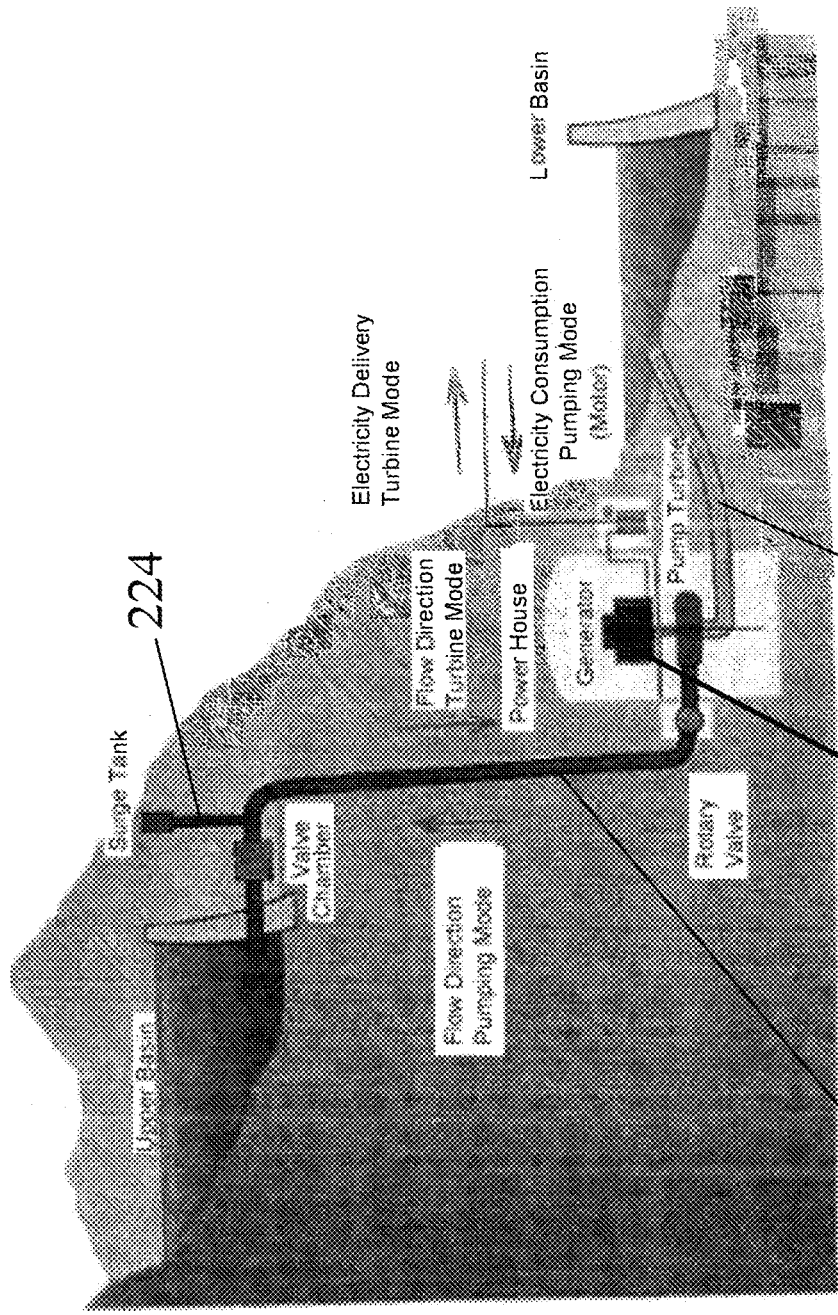
FIG. 1a is a schematic of a conventional (prior art) pumped storage facility.
Figure 1B:
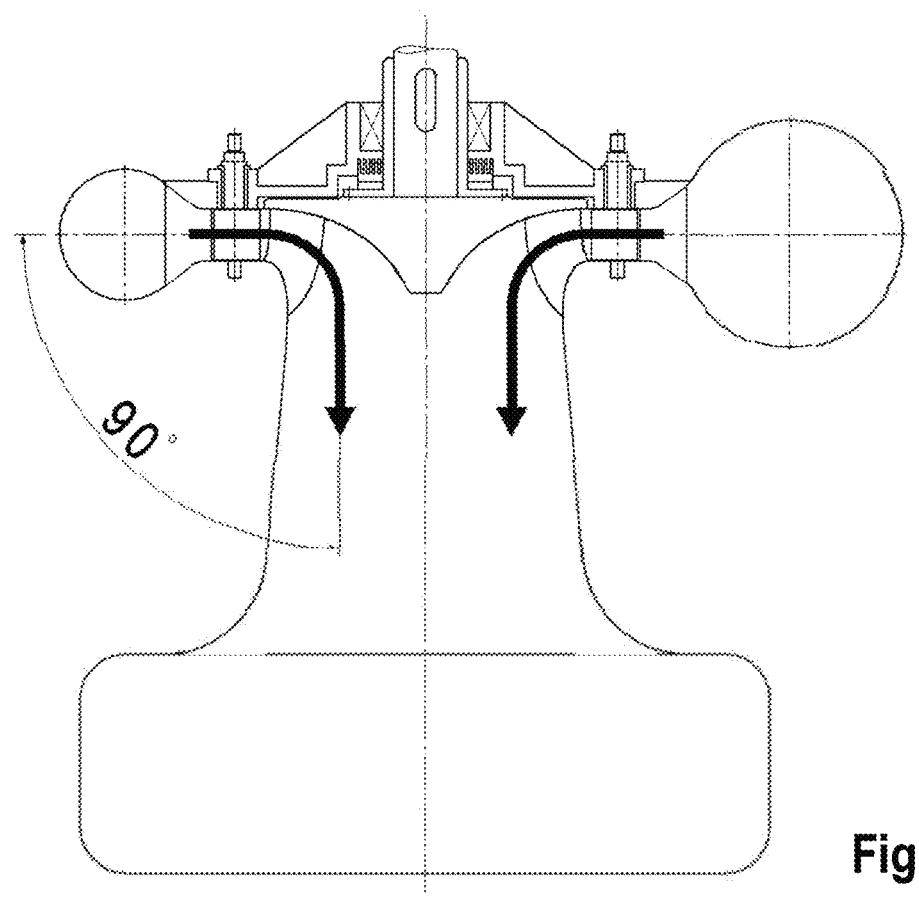
FIG. 1b and FIG. 1c are sectional elevation drawings of a conventional pump-turbine.
Figure 1C:
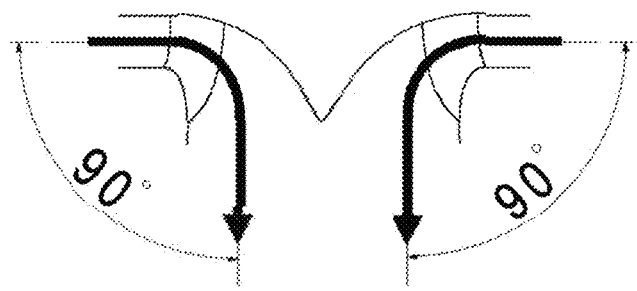

Referring to FIGS. 1a, 1b, and 1c, a conventional pumped storage plant with a reversible pump-turbine is shown. There are several notably expensive features in such a conventional installation. These include;
1) A surge shaft 224 is typically needed to relieve waterhammer that can result from a load rejection.
2) An underground powerhouse 225 below tailwater level. Such a powerhouse is expensive to construct and is at risk of flooding due to human error or component failure. Flooding of an underground powerhouse is a hazard to the facility itself as well as to its operators.
3) The penstock 226 and tailrace conduit 227 must be routed, at great expense to the same low elevation as the powerhouse itself.

Figure 2:
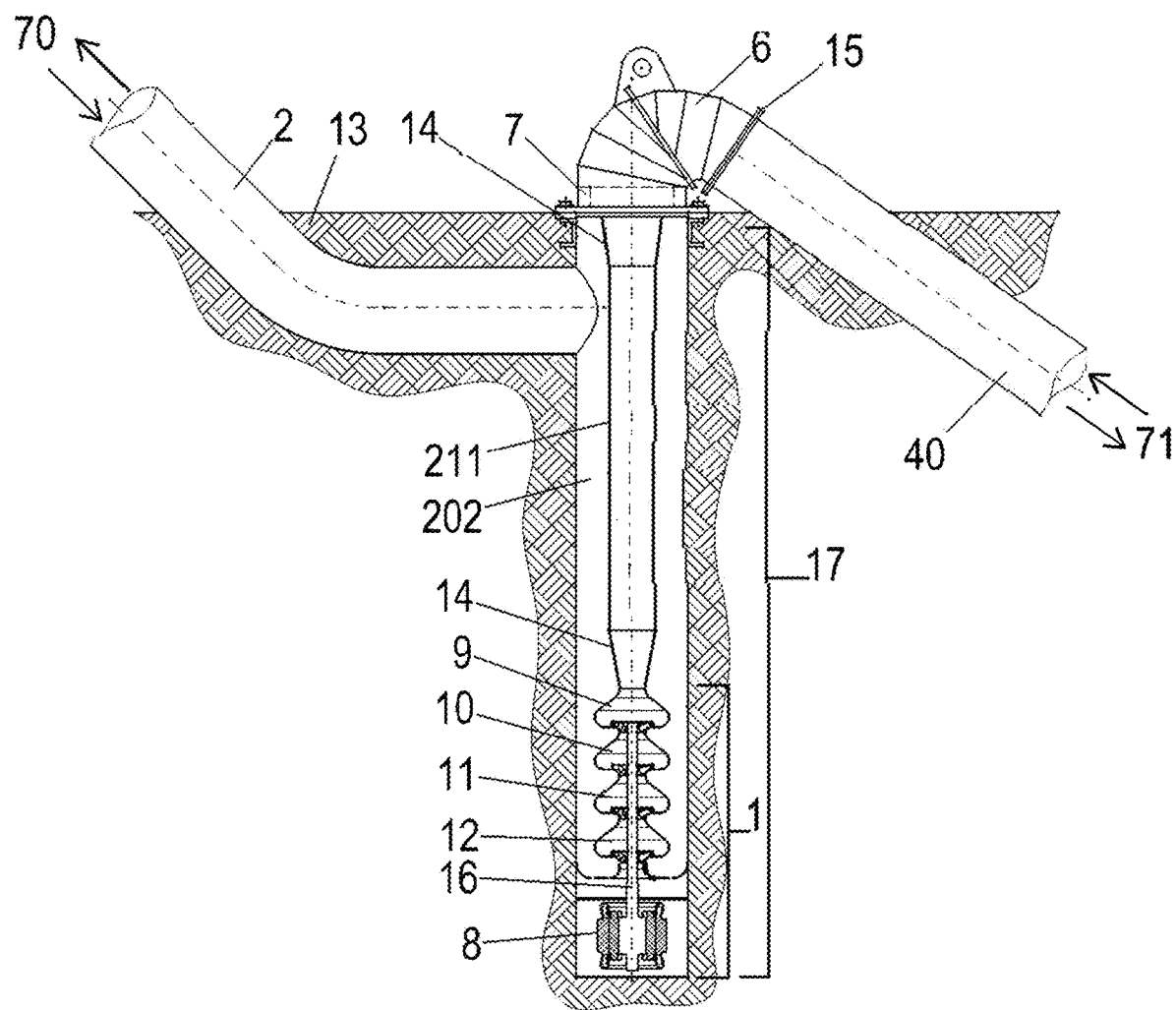
FIG. 2 is a section through the meridional plane of an embodiment of the invention. The lower portion of FIG. 2 shows a known multistage well pump that this embodiment incorporates.
Figure 3:
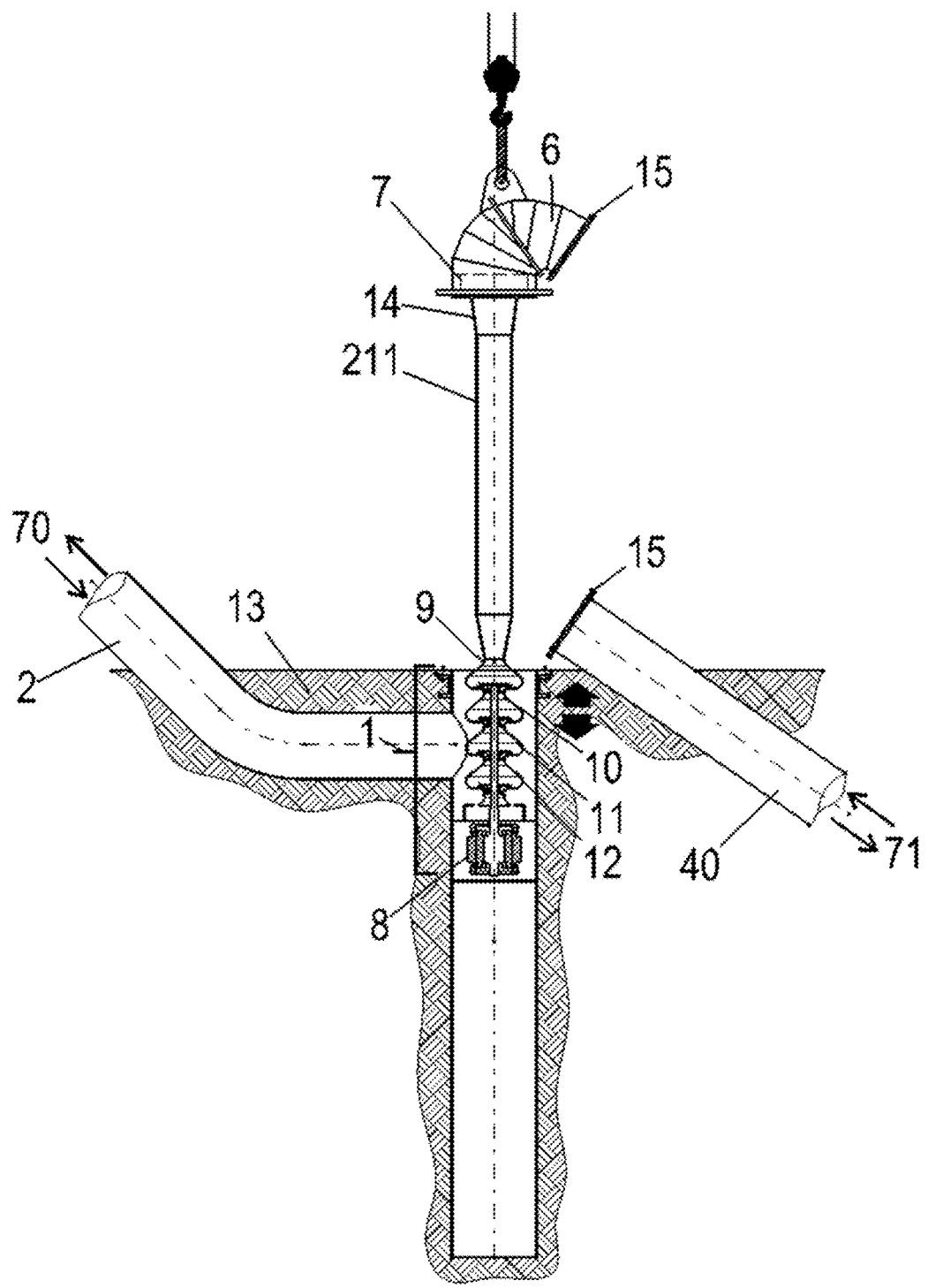
FIG. 3 is an elevation view of the pumped storage facility of FIG. 2 shown with the pump-turbine assembly partially removed.

Referring to FIGS. 2 and 3, a reversible pump-turbine installation in accordance with the present invention is shown. No underground powerhouse is required. Instead, a vertical borehole 17 allows the pump-turbine and motor-generator assembly 1 to be installed, removed for maintenance as needed, and reinstalled, while providing the desired low height-of-setting of the unit below tailwater. The height of setting must be sufficiently low that the plant cavitation coefficient (plant sigma) is greater than the critical cavitation coefficient (critical sigma), the cavitation coefficient being defined as the ratio of absolute pressure at the low-pressure side of the runner divided by the vapor pressure of water at the temperature of the water. Shaft 16 connects submersible motor-generator 8 to pump-turbine stages 9, 10, 11, and 12. Vertical tailwater conduit (draft tube 211) connects to pressure relief valve diffuser 14 above the point of entry of penstock 2. Pressure relief valve 7 is preferably mounted to removable manifold 6. Removable manifold 6 bolts down to foundation 13 and connects to tailrace conduit 40 at flanges 15. Tailrace conduit 40 leads to the lower reservoir 71. It should be noted that the number of stages may be adjusted according to head, height of setting, speed, installation rating and other factors. Penstock 2 connects to upper reservoir 70. Tailrace conduit 40 connects to the lower reservoir 71. Water flows through outer annulus 202 of borehole 17 toward the upper reservoir 70.

It should be noted that the removable portion may be further divided into conveniently separable subassemblies 6, 190, 14 and 5. For example, the manifold 6 might be lifted off first, the draft tube 211 might be lifted next, and the pump-turbine stages 9, 10, 11, and 12 might be lifted last along with the motor-generator 8. In the case of a motor-generator on top, the stator might be left in place while the rotor, shaft, and balance of the assembly might be lifted out last.

Figure 4A:
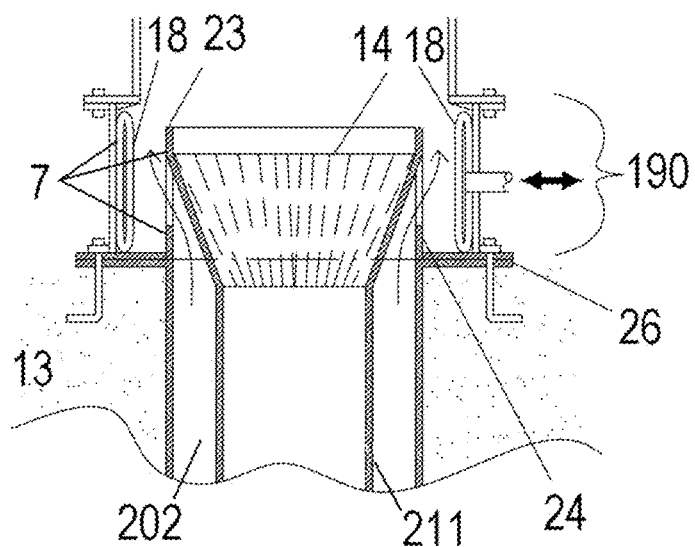
FIGS. 4a and 4b are sectional elevations of a pressure relief valve configured for use with the present invention.
Figure 4B:
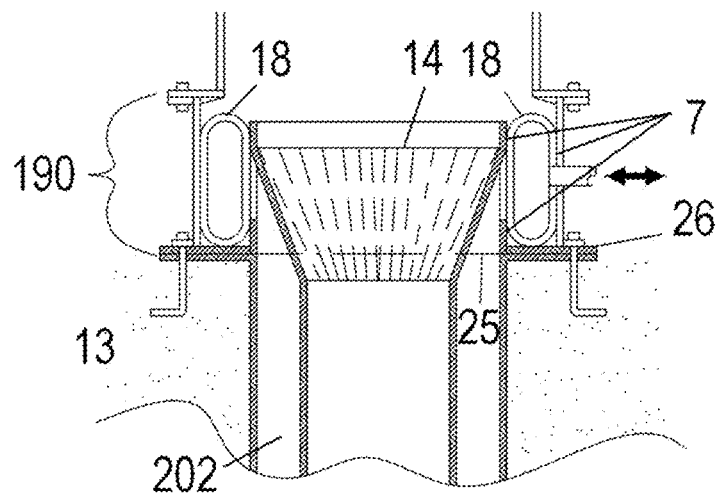

Referring to FIGS. 4a and 4b, a cross section of a pressure relief valve suitable of use in conjunction with the present invention is shown in its opened and closed positions respectively. Diffuser 14 is connected to ribs 25. Ribs 25, ring 23, and ring 24 together radially support bladder 18 on its inner diameter surface when its inflation pressure is greater than the pressure in borehole 17. Inflatable bladder 18 is supported from below by flange 26 and on its outside diameter by enclosure 190. The air pressure in bladder 18 may be precisely adjusted to just stop leakage from borehole 17 into manifold 6 (at tailwater pressure). As is clear from FIG. 4a, when relief valve 7 is open, water in annulus 202 will flow along the arrows; when relief valve 7 is closed (FIG. 4b), such flow is blocked.

Figure 5A:
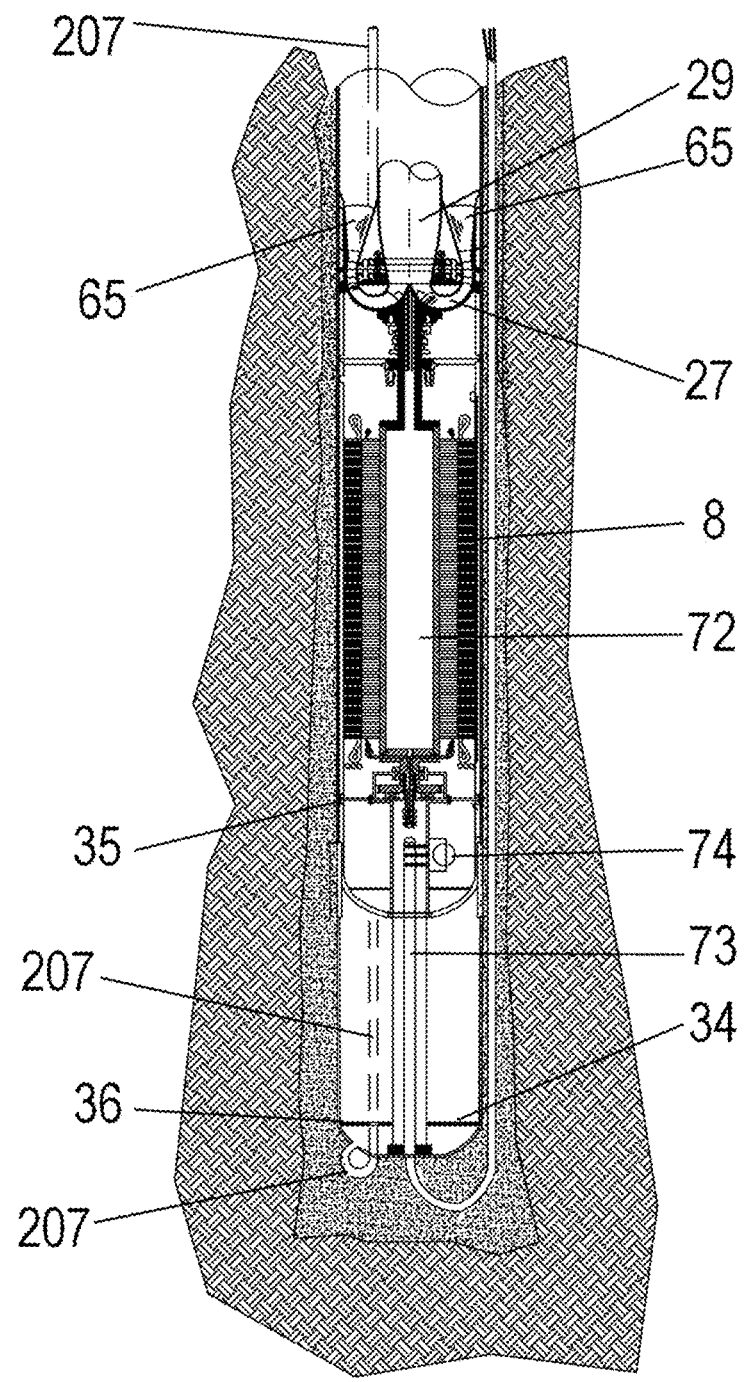
FIG. 5a-c are sectional elevation drawings of a reversible pump-turbine in accordance with the present invention.
Figure 5B:
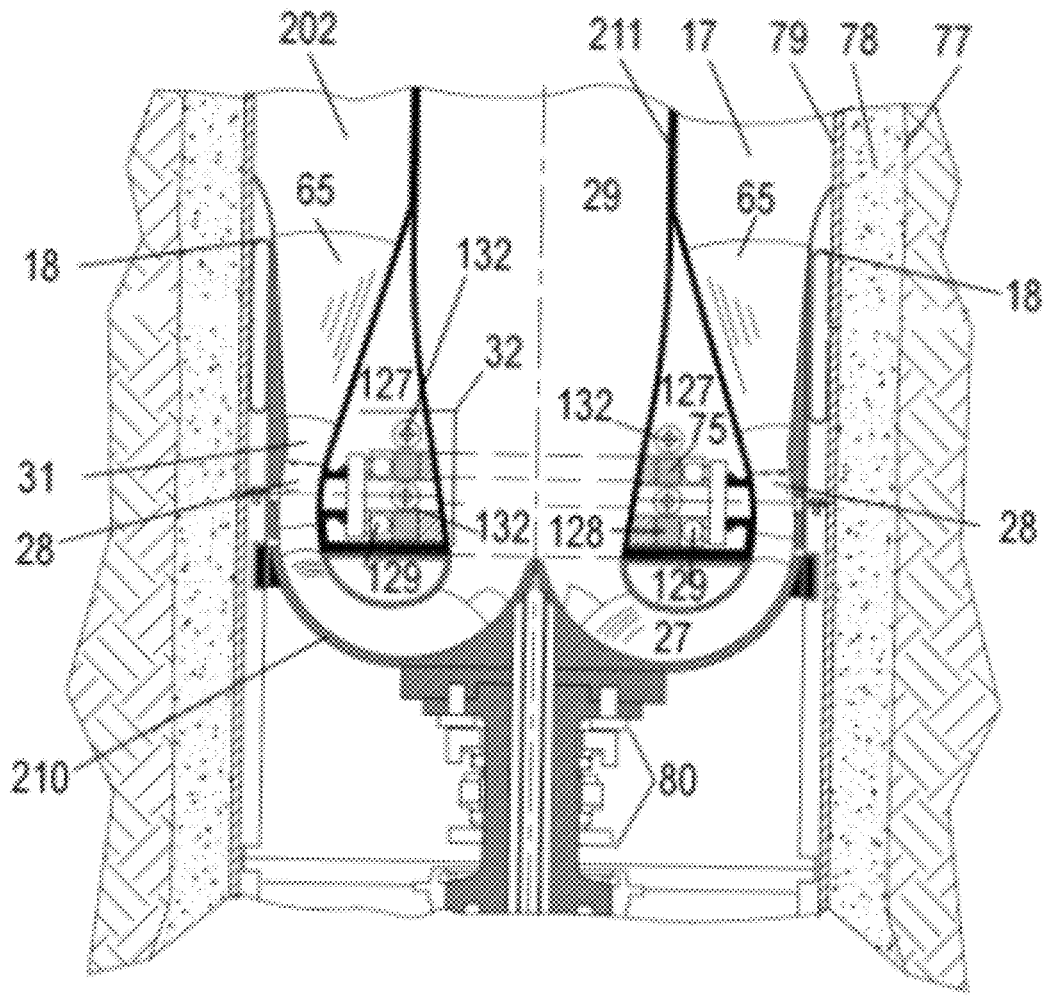

Referring to FIGS. 5a and 5b a sectional elevation of a pump-turbine in accordance with the present invention is shown. Runner 27 is designed around a toroidal flow path wherein water reverses direction by approximately 180 degrees in the meridional plane. Wicket gates 28 make up an axial flow distributor. Turbine diffuser 29 recovers turbine runner exit energy. Diffuser vanes 65 (e.g., pump-turbine diffuser vanes) provide mechanical support to the distributor hub 31, turbine diffuser 29 as well as wicket gate actuation system 32. Motor-generator 8 (e.g., submersible motor-generator) is preferably located below the turbine. Hoisting piston 34 may be used to raise and lower, using water pressure, the entire pump-turbine assembly with connected draft tube segments, pressure relief valve and elbow. Hoisting piston 34 may incorporate upper seal ring 35 and lower seal ring 36 to maintain a seal while passing across the tailrace connection.

Hollow shaft 72 (of motor-generator 8) may be used as a heat pipe evaporator in conjunction with the runner 27 serving as a condenser. Electrical connector 73 engages electrical receptacle assembly 74 when the machine is lowered.

A wicket gate actuation system 32 can be fitted into the hollow space 127 between turbine diffuser 29 and diffuser vanes 65.

The wicket gate actuation system 32 is comprised of servo actuators 132 that drive the upper shifting ring 75 and lower shifting ring 128 in opposite directions. This rotates the crank arm ball 129, that in turn positions the wicket gate 28.

Borehole 17 is associated with rock face 77, grout 78 and borehole liner 79 (e.g., steel liner).

Shaft seal assembly 80 keeps the motor-generator enclosure dry.

Figure 5C:
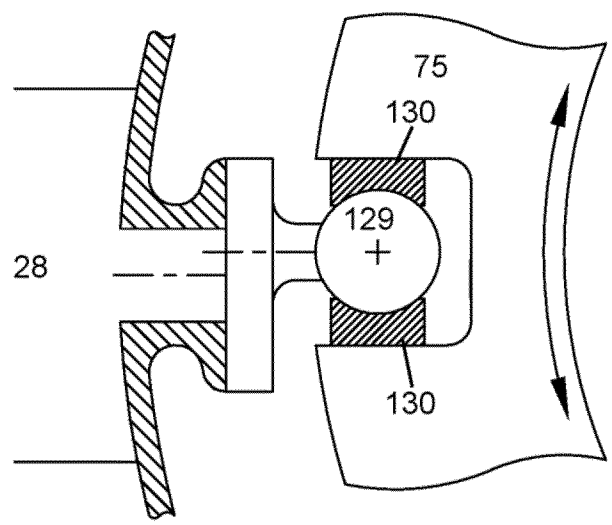

Referring to FIG. 5c, Wicket gate 28 is rotated by crank arm ball 129 (here, upper crank arm ball) seated in upper spherical bearing 130 that is rotated about turbine axis by upper shifting ring 75. Lower crank arm ball (not shown) is actuated in the opposite direction by lower shifting ring (128 in FIG. 5b) in order to impose a pure toque on wicket gate 28.

Figure 6:
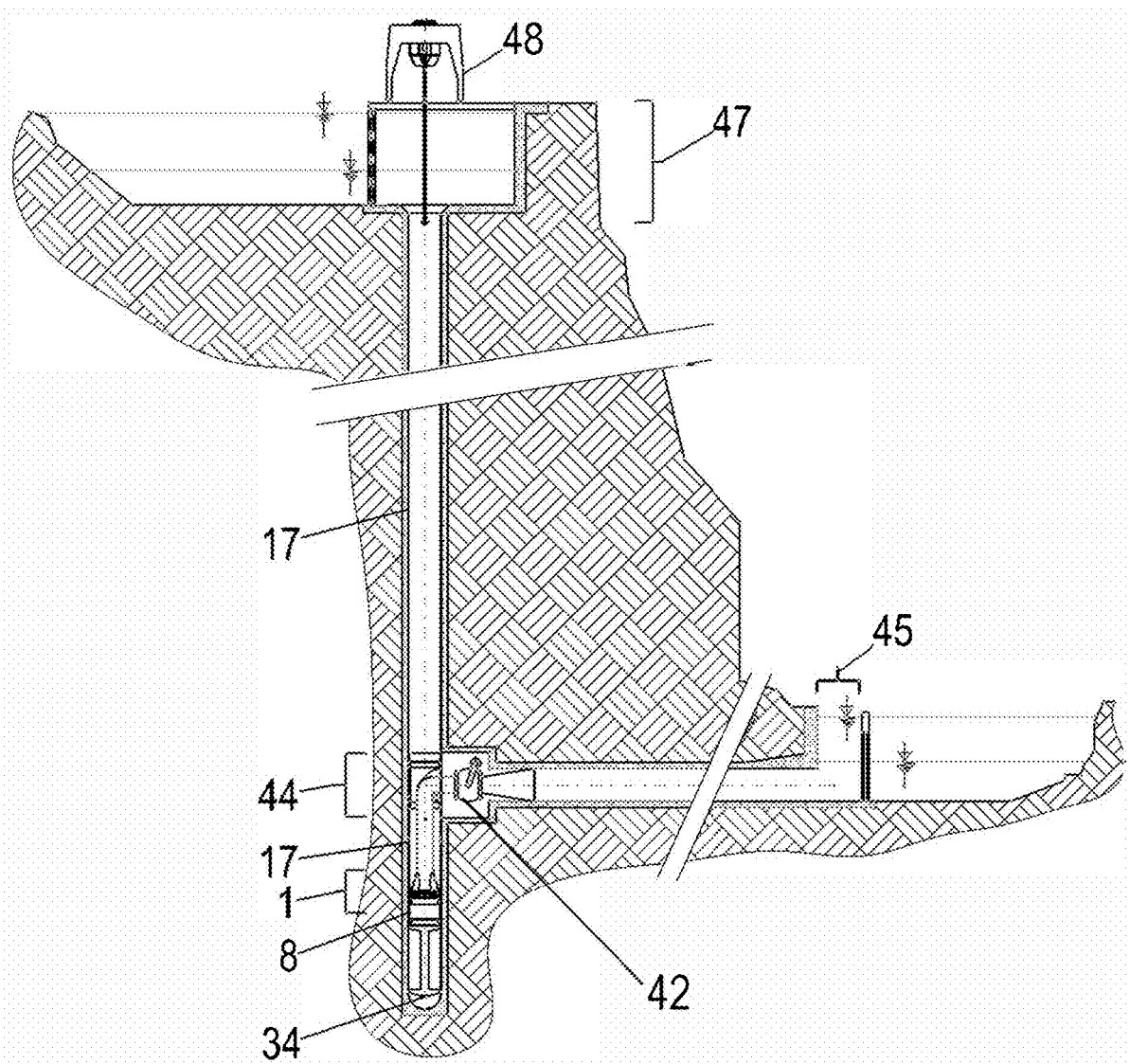
FIG. 6 is a cutaway rendering of a reversible pump-turbine and associated pumped storage facility in accordance with the present invention.

Referring to FIG. 6, hoisting piston 34 supports motor-generator 8 and pump-turbine 37 during raising and lowering.

Referring to FIG. 6, valve 42 may be used to fill vertical borehole 17 during hydraulic raising and lowering of pump-turbine and motor-generator assembly 1 with attached pipe, elbow, and pressure relief assemblies 44. Lower portal 45 serves to launch the tunnel boring machine during the construction phase and serves as pumping inlet works. Headworks 47 serves as upper portal during construction and as service platform during maintenance. Crane 48 may be used to disassemble draft tube segments, elbow assembly and pressure relief valve from pump-turbine for maintenance.

Figure 7:
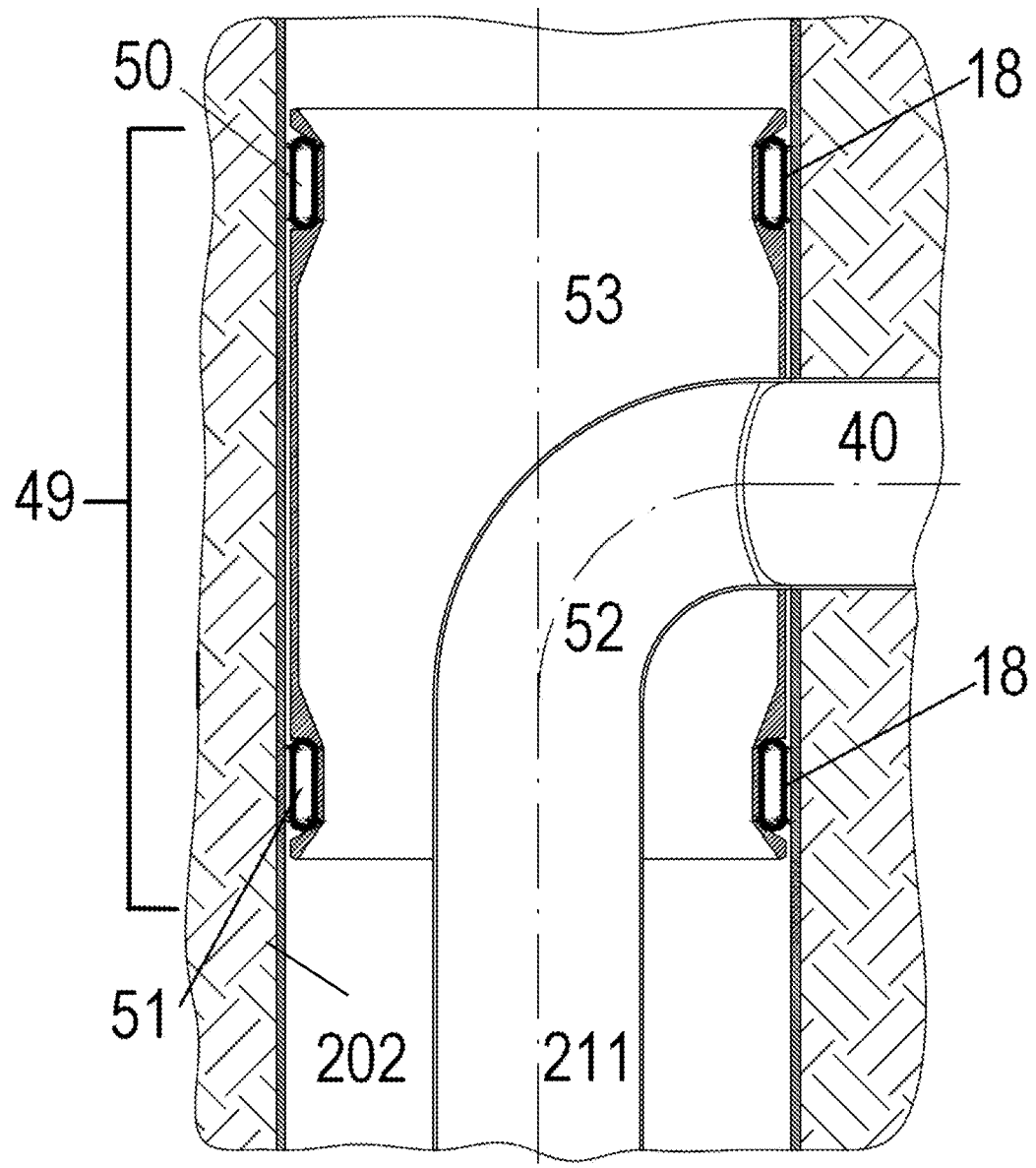
FIG. 7 is a cutaway view of an elbow connection to the tailrace tunnel with an inflatable bladder to secure and seal it in accordance with the present invention.

Referring to FIG. 7 an elbow assembly 49 is shown. Upper inflatable bladder 50 seals the upper end. Lower inflatable bladder 51 closes the lower end. Elbow 52 directs flow to the tailrace conduit 40. Spool 53 travels with the pump-turbine during maintenance moves.

Figure 8:
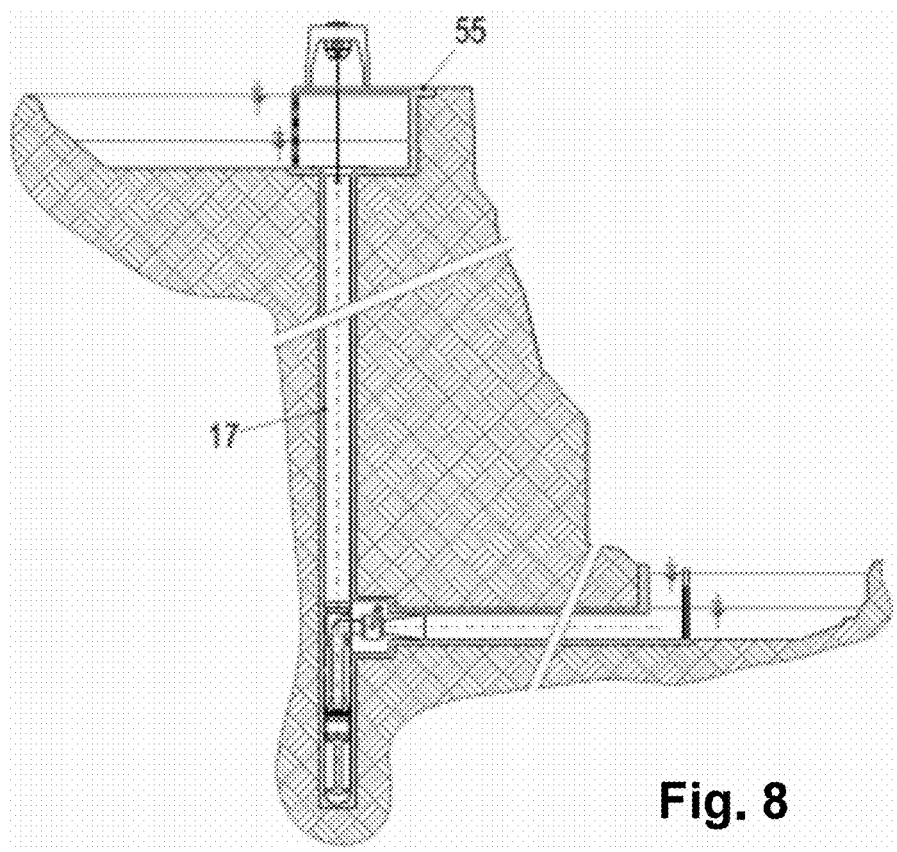
FIG. 8 is a sectional elevation drawing of a pump-turbine installation with the vertical borehole collocated with the headworks in accordance with the present invention.

Referring to FIG. 8 an installation is shown wherein the borehole 17 is located under the headworks 55.

Figure 9:
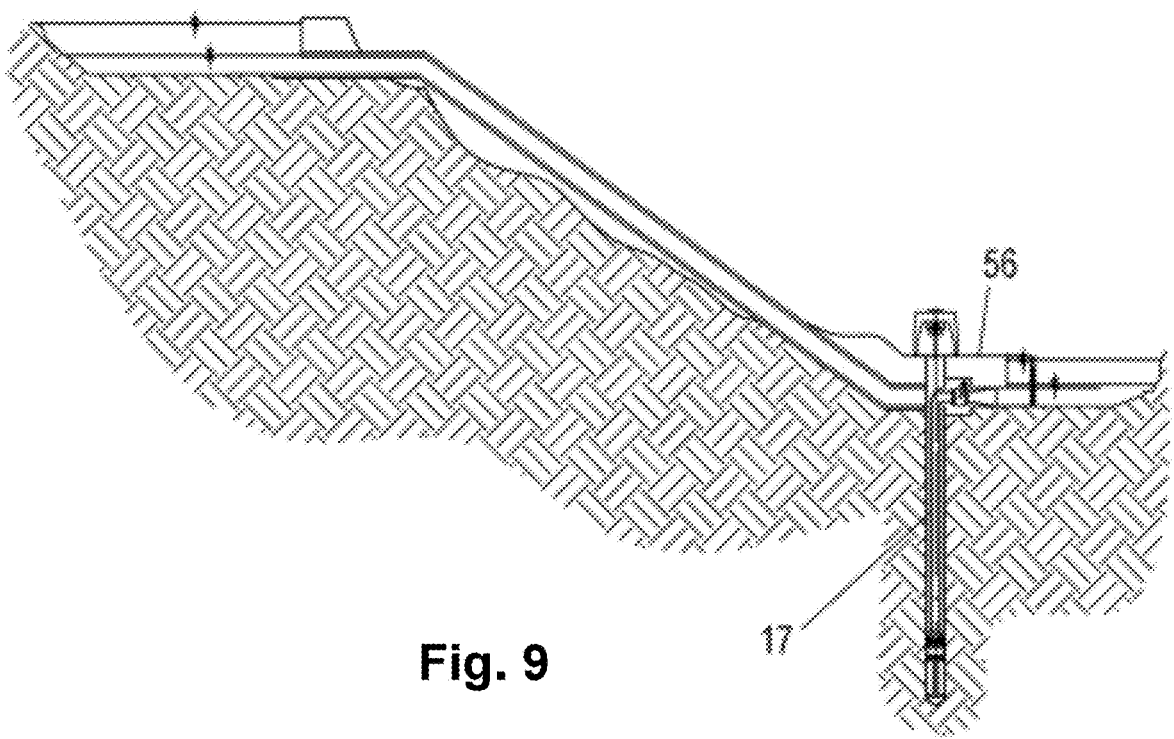
FIG. 9 is a sectional elevation drawing of a pump-turbine installation with the vertical borehole collocated with the tailrace portal in accordance with the present invention.

Referring to FIG. 9, the borehole 17 is located below the tailrace portal 56.

Figure 10:
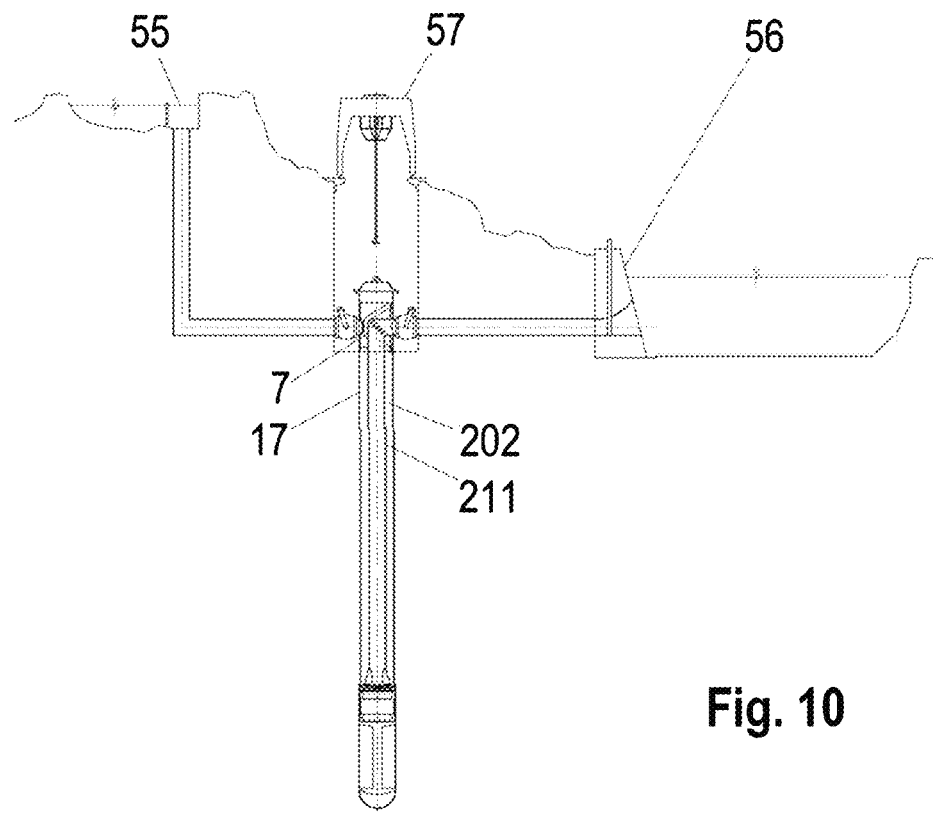
FIG. 10 is a sectional elevation drawing of a pump-turbine installation with the vertical borehole located between the headworks and the tailrace portal in accordance with the present invention.

Referring to FIG. 10, borehole 17 is located at a location between the headworks 55 and tailrace portal 56. Overhead crane 57 facilitates removal of equipment from borehole 17.

Figure 11:
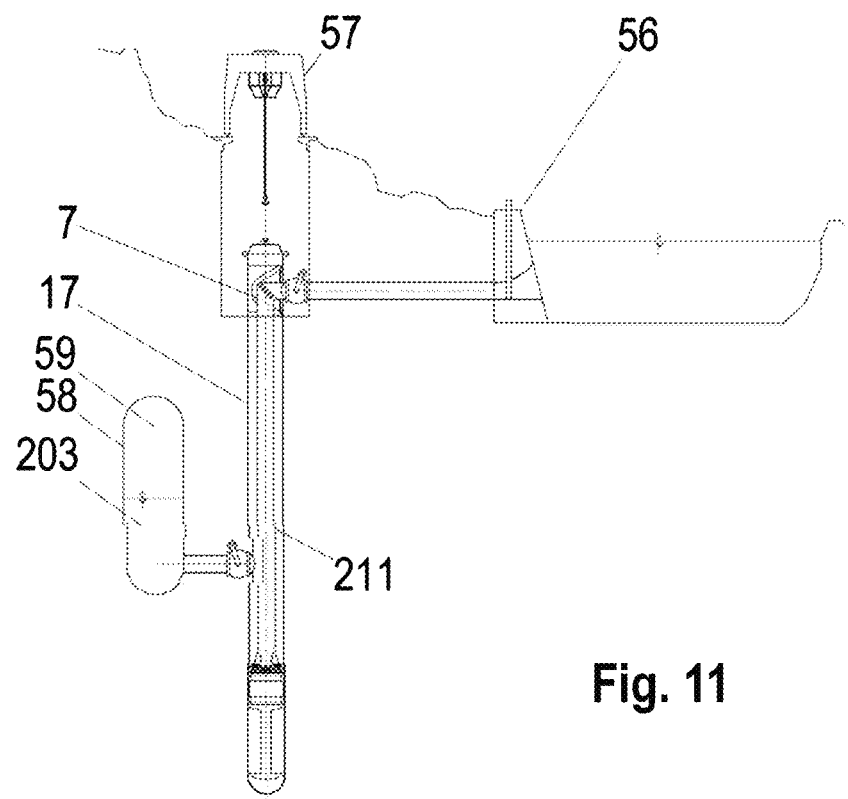
FIG. 11 is a sectional elevation drawing of a pump-turbine installation with the vertical borehole located in association with an underground pressured water storage cavity that serves as the "upper" reservoir.

Referring to FIG. 11, borehole 17 provides a connection to pressurized reservoir 58 as well as to tailrace portal 56. Overhead crane 57 facilitates removal of equipment from borehole.

Figure 12:
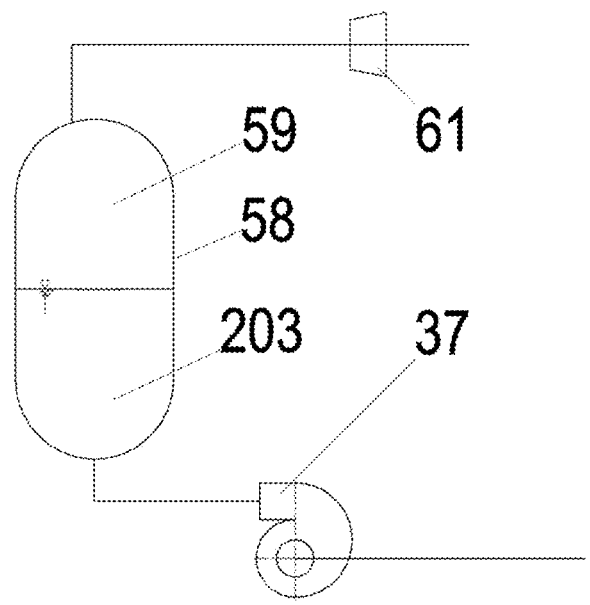
FIG. 12 is a schematic of a pump in accordance with the present invention in association with an air/water accumulator, most likely underground, and a gas turbine.

Referring to FIG. 12 water 203 of pressurized water reservoir 58 is shown in conjunction with a pressurized air column 59. Pump or pump-turbine 37 may be in accordance with this invention or may be conventional. Air 59 may be fed to a gas turbine generator set 61.

Figure 13:
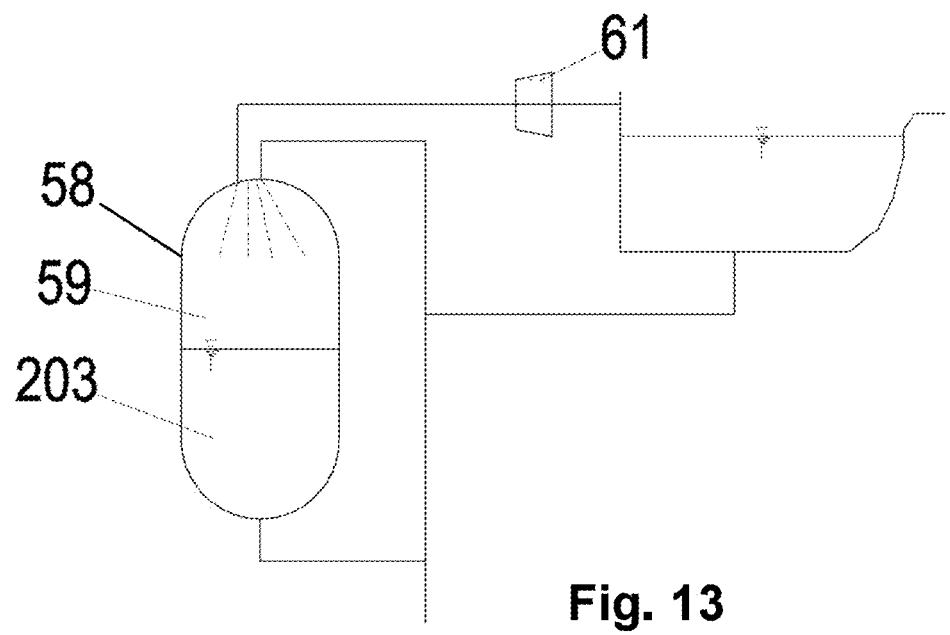
FIG. 13 is a schematic of a pump in accordance with the present invention in association with an air/water accumulator, most likely underground, and a gas turbine, wherein the air may be nearly isothermally compressed with the aid of water spray cooling.

Referring to FIG. 13, spray cooling of the air being compressed may be used to provide isothermal air compression.

Figure 14:
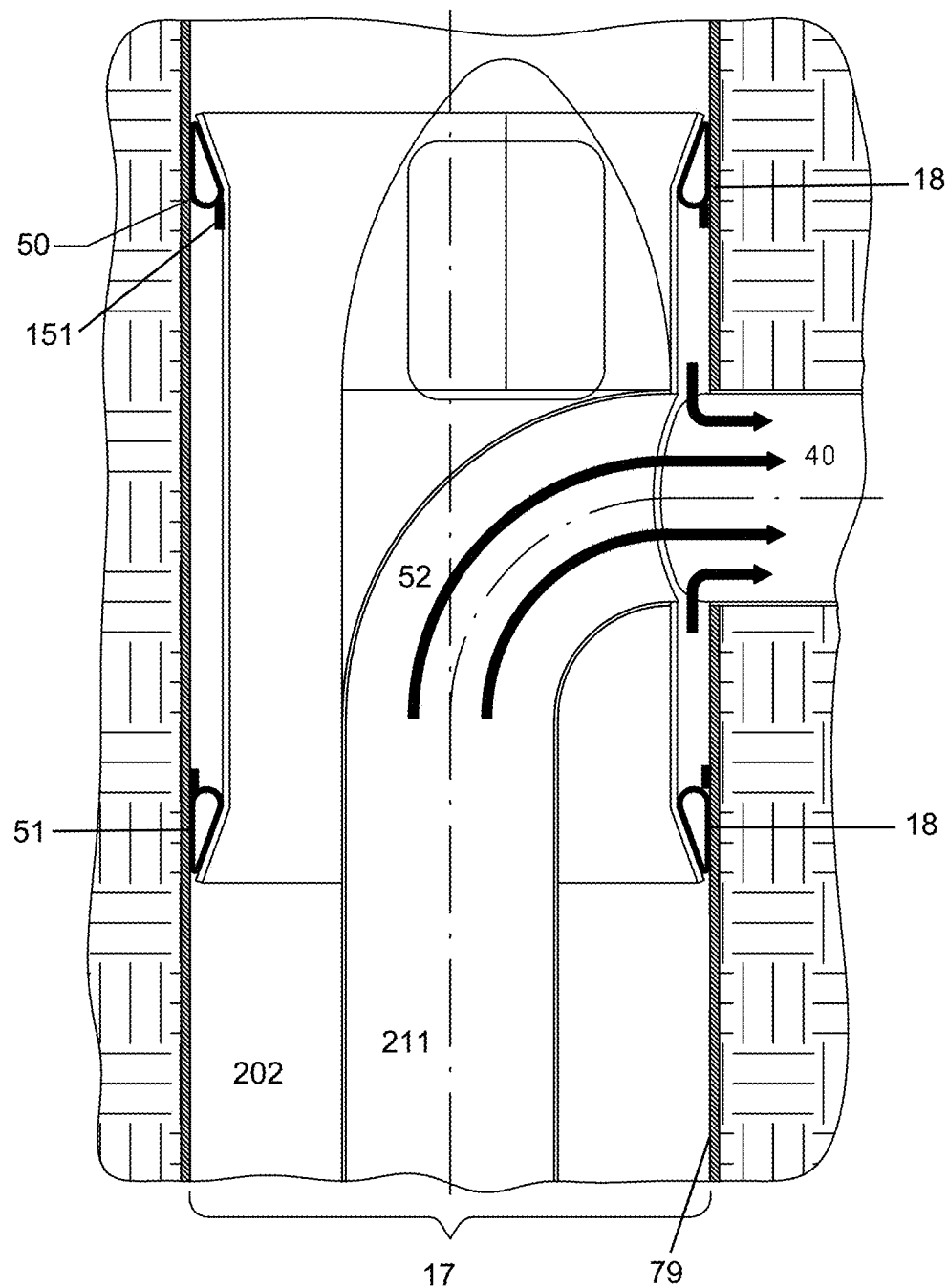
FIG. 14 illustrates a tailrace connection elbow in accordance with the present invention that incorporates inflatable bladders (upper bladder and lower bladder) that also serve as an adjustable pressure relief element. The embodiment of FIG. 14 features a flow separation control fin to reduce vibration during operation.

Referring to FIG. 14, pressure relief valve 7 positioned in borehole 17 is shown in conjunction with elbow 52 and tailrace conduit 40 (here, horizontal tailrace conduit). Borehole liner 79 is shown. The embodiment of FIG. 14 incorporates inflatable bladders 18 (upper bladder 50 and lower bladder 51) that serve as an adjustable pressure relief element. The embodiment of FIG. 14 features a flow separation control fin 151 to reduce vibration during operation.

FIGS. 6, 16, 17 and 18 depict one of many possible installation configurations.

FIG. 15 shows perforations 183 in seal seat 63 to which inflatable bladder 18 of relief valve 7 seals to create a seal, under normal operating penstock pressure.

FIG. 16 shows perforations 183 in the seal seats 63 to which inflatable bladder 18 of relief valve 7 seals to create a seal, under normal operating penstock pressure.

Figure 17:
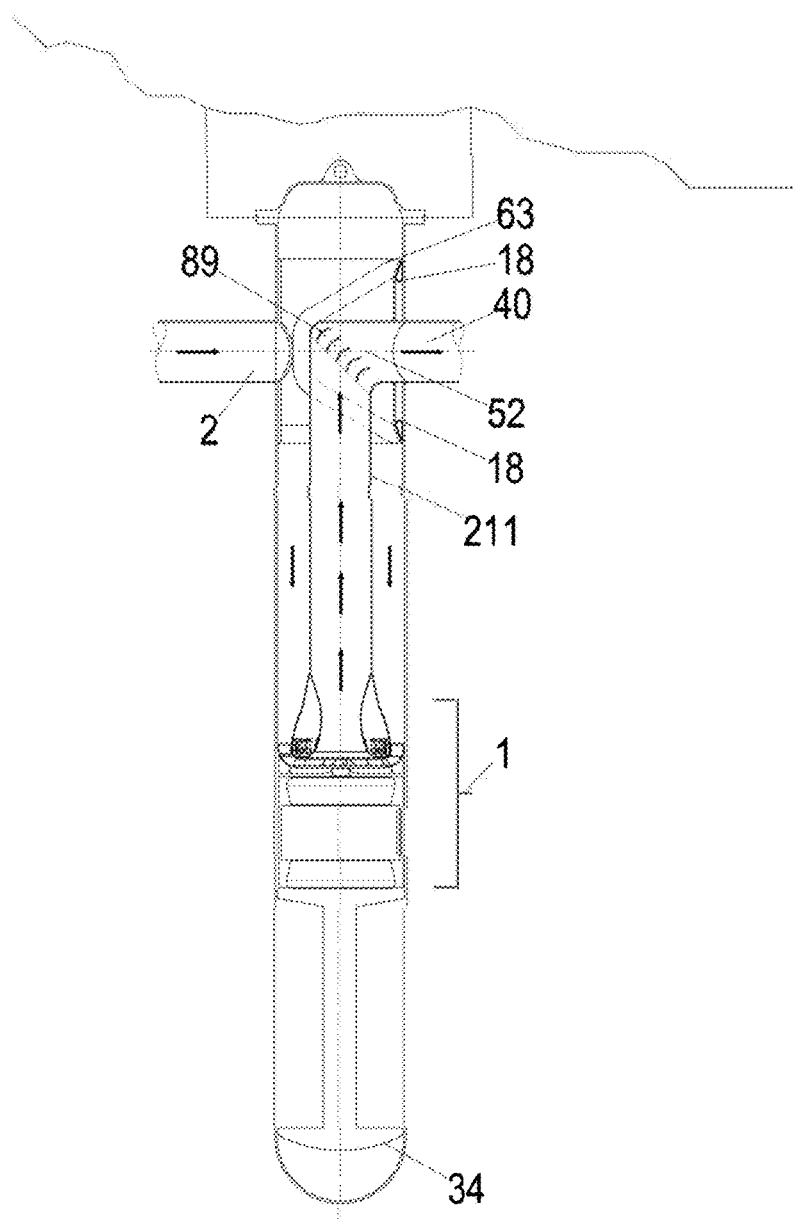
FIG. 17 illustrates a pumped storage installation in accordance with the present invention including a tailrace connection elbow.

Referring to FIG. 17, shows another embodiment wherein seal seat 63 may also serve as part of a pressure relief valve.

Figure 18:
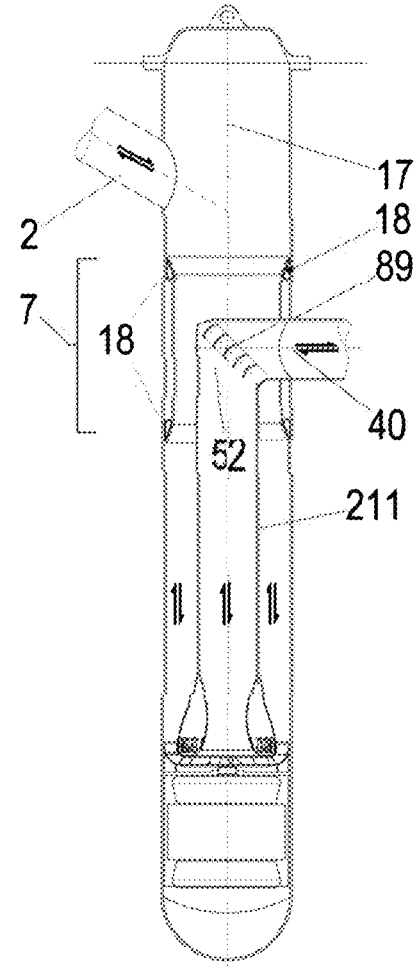
FIG. 18 illustrates a pumped storage installation in accordance with the present invention including a tailrace connection elbow.

Referring to FIG. 18, pressure relief valve 7 positioned in borehole 17 is shown in conjunction with elbow 52 and tailrace conduit 40. Borehole liner 79 lining borehole 17, is shown, as are guide vanes 89 in elbow 52.

Figure 19:
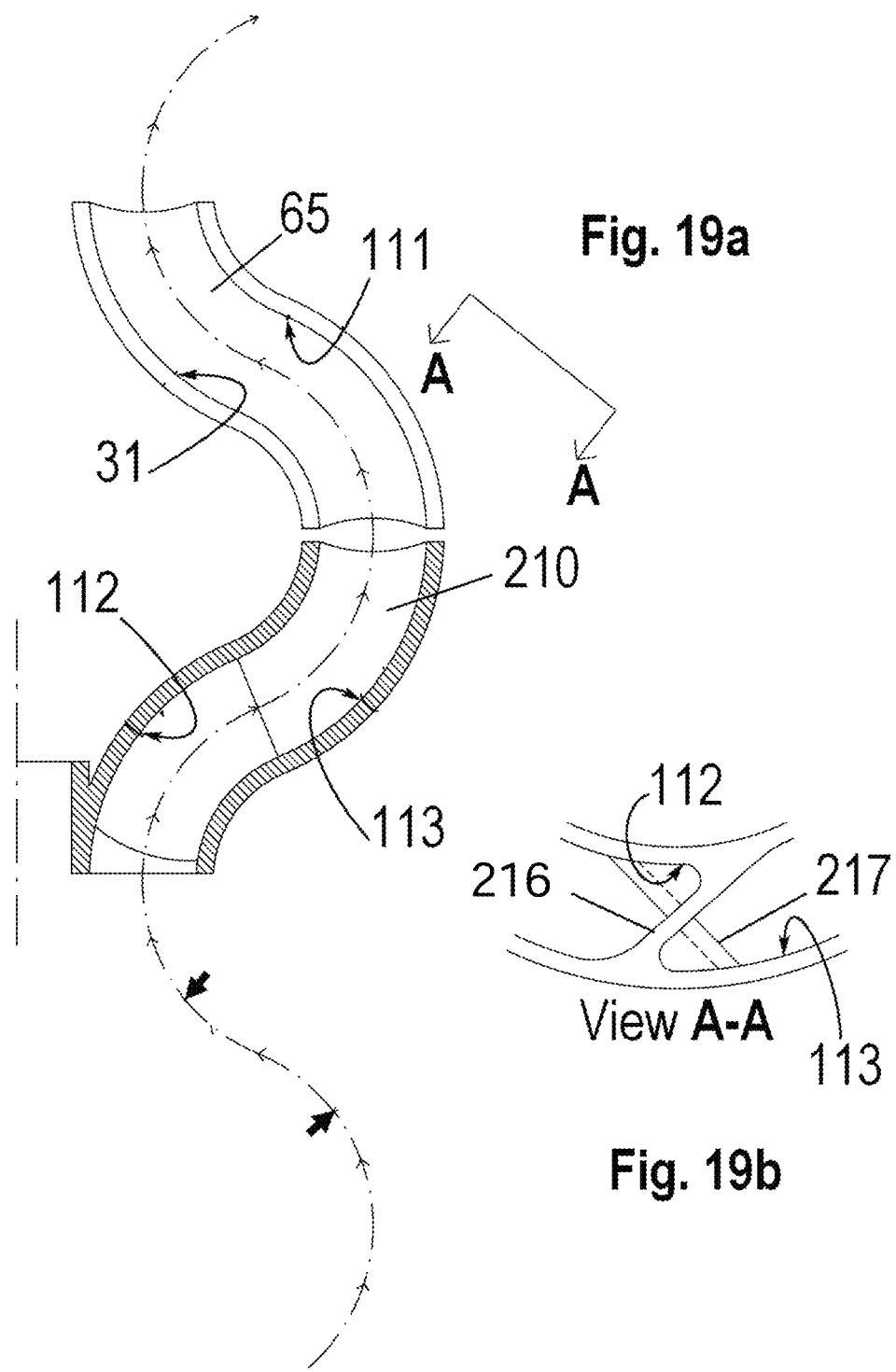
FIGS. 19a and 19b are meridional plane sections of a multistage pump impeller in accordance with the present invention.

Referring to FIGS. 19a and 19b a runner for a pump or reversible pump turbine is shown wherein flow is directed along a smooth sinusoidal path within the meridional plane. Blades impart circumferential acceleration vector and acceleration vectors within meridional plan to guide water through water passageway. Blade sequences may be normal to vector sum. The larger impeller is more efficient and provides higher head per stage. Impellers may be best made by 3D printing.

Referring to FIGS. 19a and 19b, a single stage of a multi-stage pump turbine is illustrated. Non-rotating diffuser vanes 65 are located between distributor hub 31 and distributor shroud 111. These accept flow in an axial direction from runner blade 210 and deliver flow, again in the axial direction, to the following stage, also in an axial direction. Rotating runner blades 210 between runner hub 112 and runner shroud 113 impart work to the fluid by applying a force in the tangential direction while also helping to guide the fluid within the meridional plane, initially outward and subsequently inward to achieve axial flow alignment prior to the fluid entering the diffuser. As can be seen in FIG. 19a, the blade portion nearer the pump inlet 217 is canted to impart simultaneous tangential force and radially outward force, while the blade portion nearer the pump outlet 216 is canted in the opposite direction in order to continue imparting tangential force while simultaneously imparting a radially inward force in order to align the flow to axially enter the subsequent diffuser stage. With the pump turbine rotating in the opposite direction, the canted blades perform a similar function in directing flow within the meridional plane but act in the tangential direction to absorb energy from the fluid.

Figure 20:
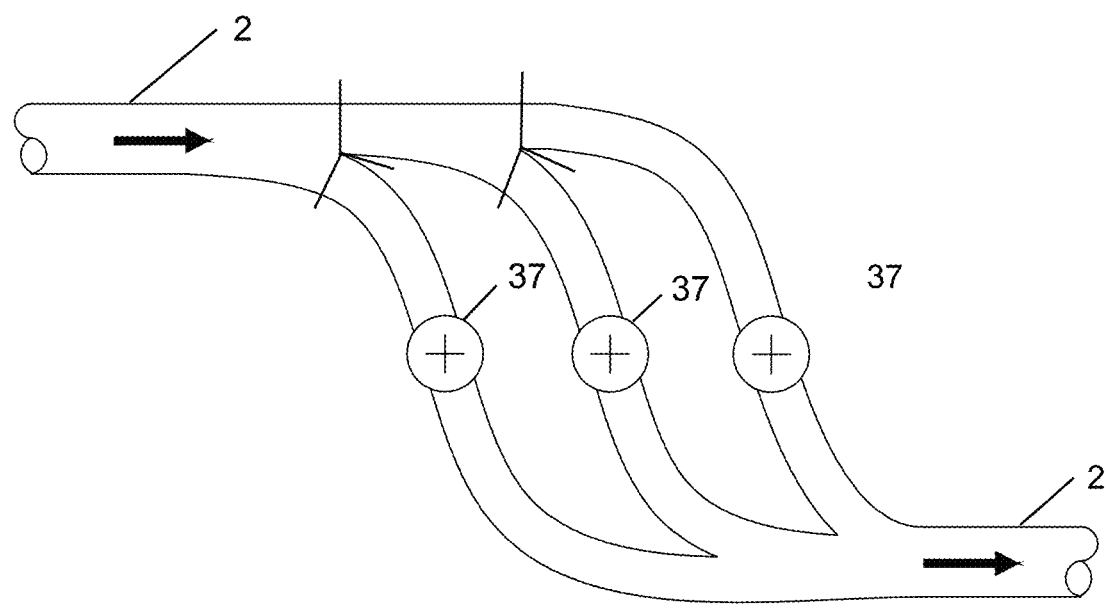
FIG. 20 is a plan view schematic of 3 pump turbines installed in association with a single penstock and a single tailrace tunnel.

FIG. 20 shows a large diameter penstock 2 bifurcated to feed multiple pump turbines 37.

Figure 21:
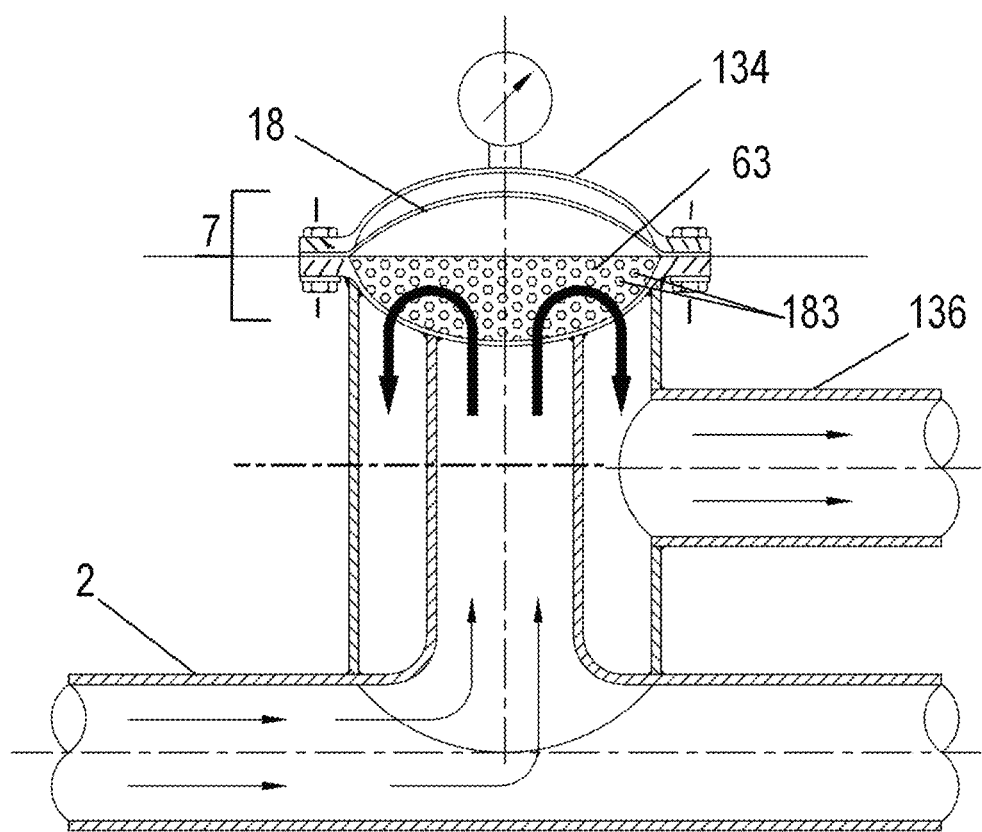
FIG. 21 shows a pressure relief valve as may appear in an embodiment of the present invention.

Referring to FIG. 21, pressure relief valve 7 allows flow from penstock 2 to a lower pressure piping system 136 when pressure in penstock 2 exceeds a set point. The pressure relief setting is achieved by pressurizing the cavity between a rubber bladder 18 and a containment dome 134. If the line pressure exceeds the pressure above the bladder 18, the bladder will be forced away from the seal seat 63, which has perforations 183. This will in-turn allow flow from the penstock 2 to the lower pressure piping system 136.

Referring to FIGS. 21, 22a, 23, 24a, 24b, 25a, 25b, 26a and 26b, various pressure relief valve configurations are shown.

FIG. 22b shows a torque key 139 positioned at the bottom of a borehole 17.

Figure 23:
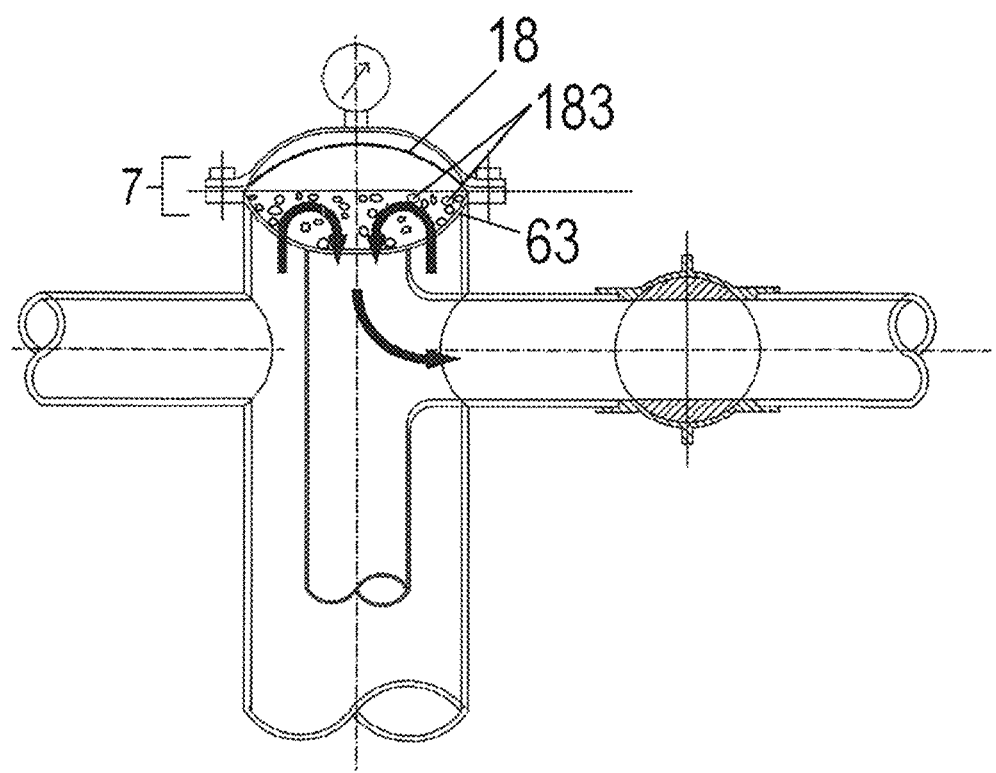
FIG. 23 is a pressure relief valve in accordance with the present invention, in open configuration.

Referring to FIG. 23, a pressure relief valve is shown in the open state with the bladder 18 lifted away from seal seat 63, which has perforations 183.

Figure 24A:
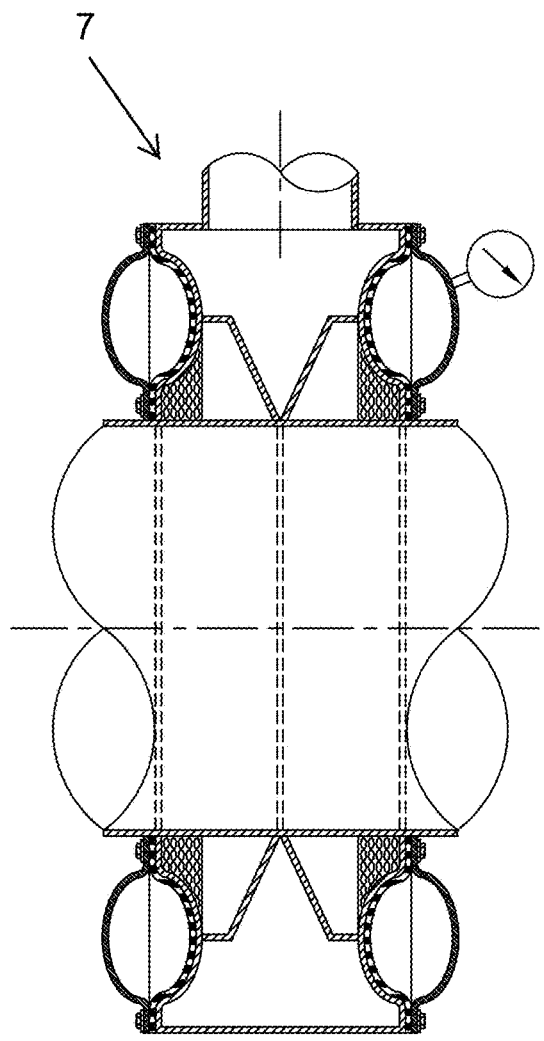
FIGS. 24a and 24b is a pressure relief valve in accordance with the present invention shown closed and open respectively.
Figure 24B:
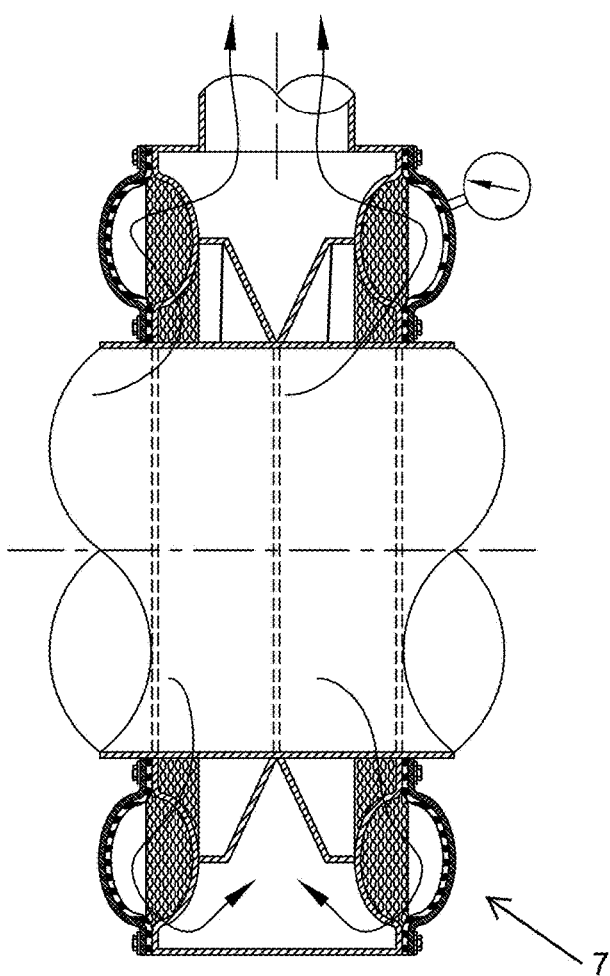
Figure 25A:
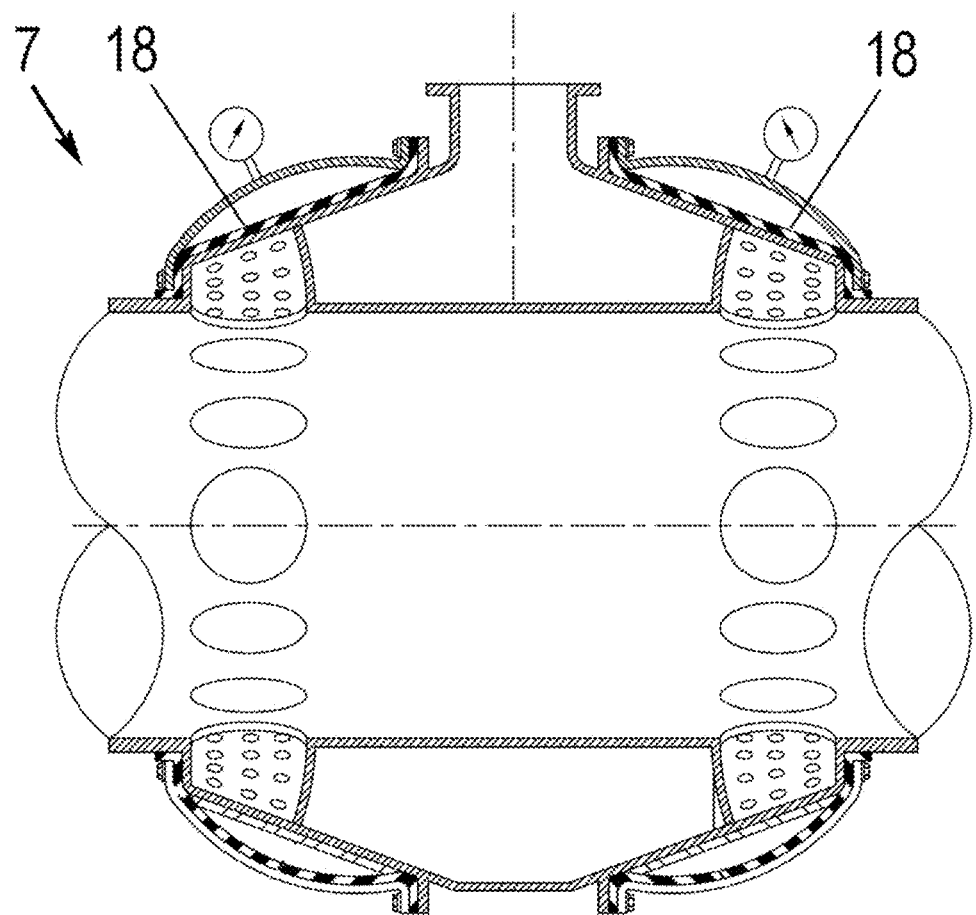
FIGS. 25a and 25b is a pressure relief valve in accordance with the present invention shown closed and open, respectively.
Figure 25B:
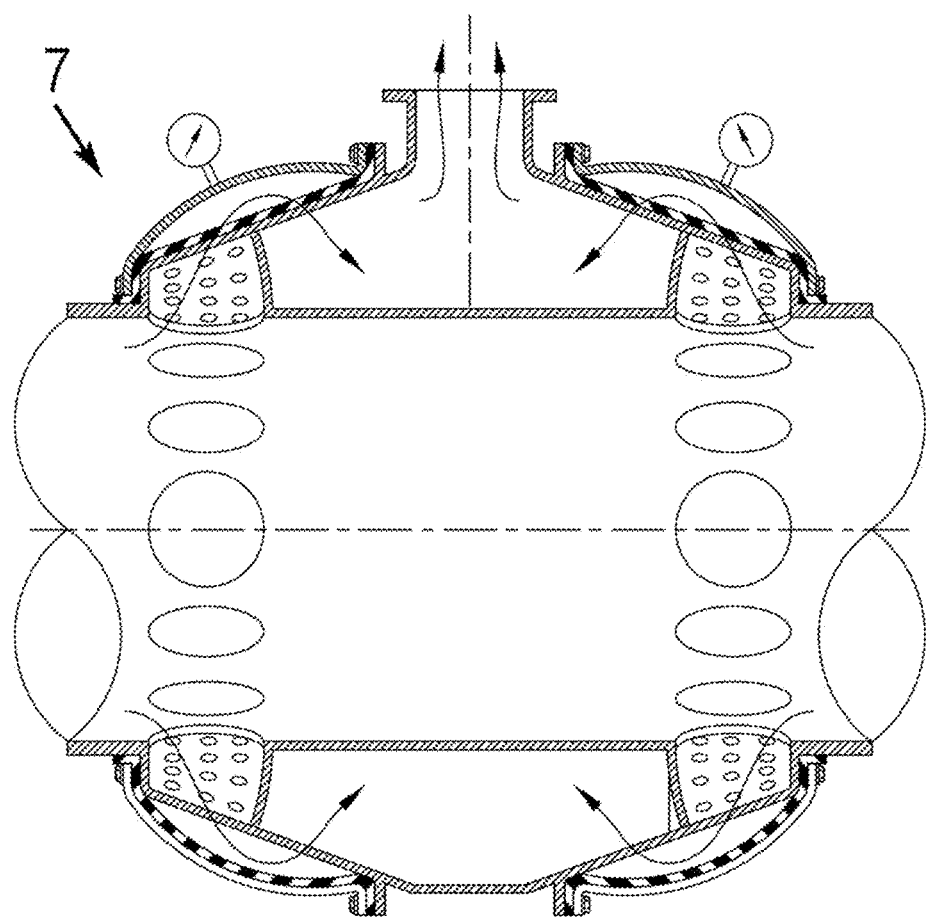
Figure 26A:
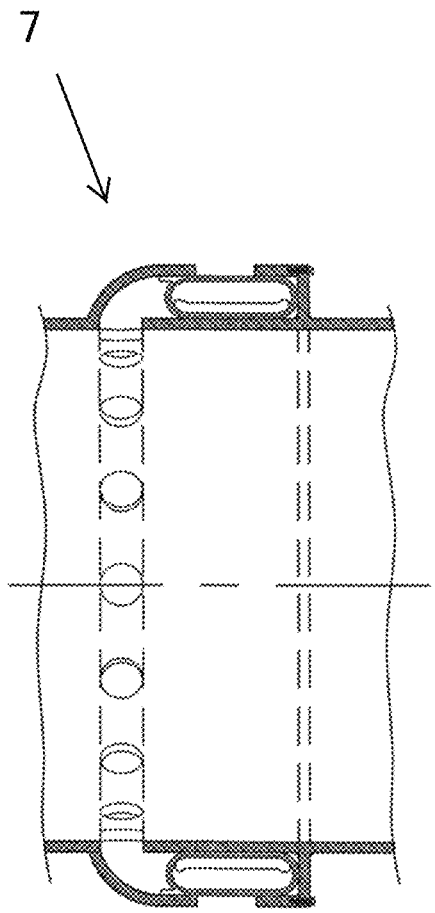
FIGS. 26a and 26b show a pressure relief valve in accordance with the present invention shown closed and open respectively.
Figure 26B:
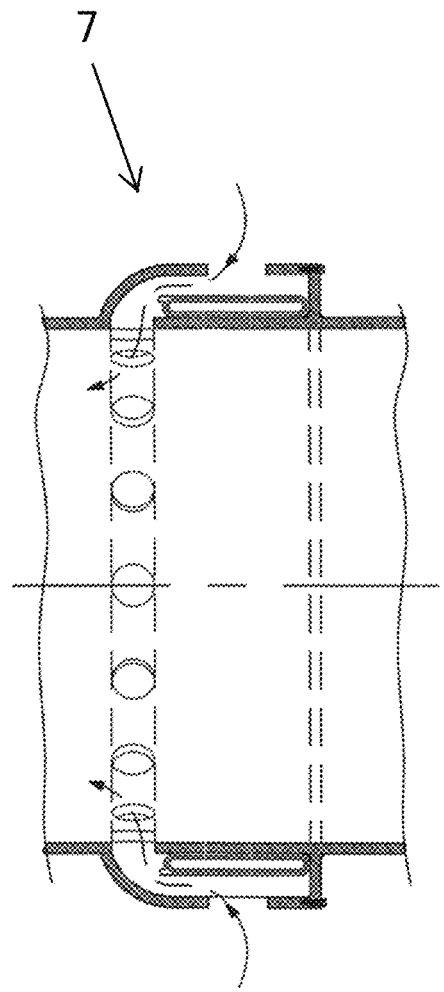

FIGS. 24a and 24b shows pressure relief valves and splitter vanes.

Figure 27A:
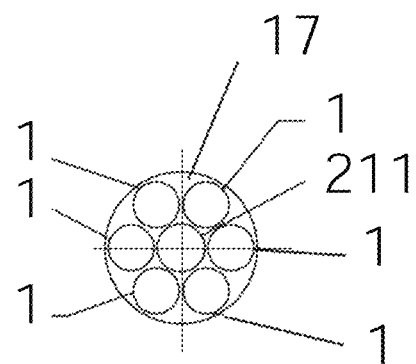
FIGS. 27a and 27b show an installation of multiple pump-turbine motor-generators in a single borehole.
Figure 27B:
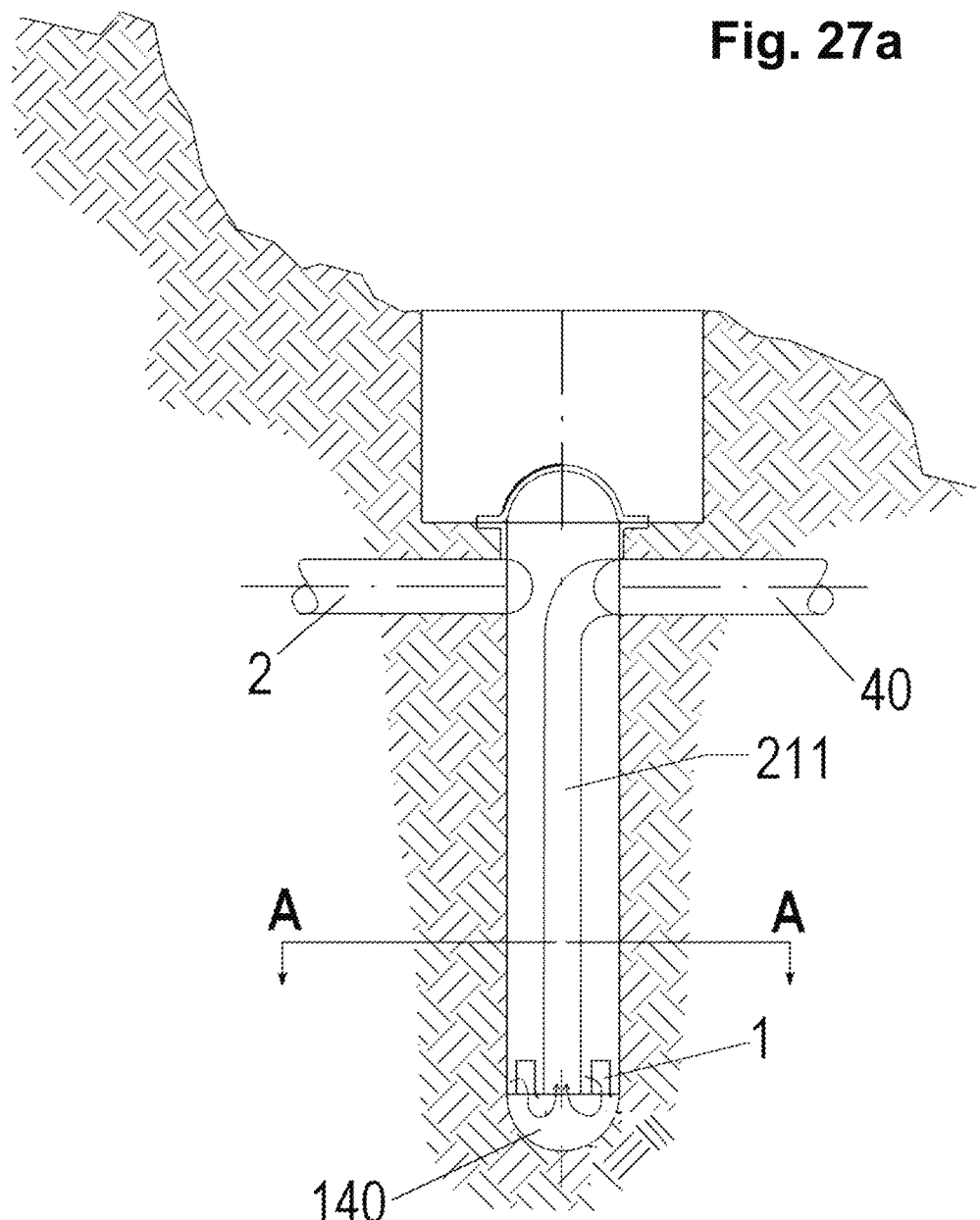

Referring to FIG. 27b, multiple pump-turbine and motor-generator assemblies 1 are shown sharing a common penstock 2 and tailrace conduit 40, on bulkhead 140.

FIG. 27a is a cross-section at section A-A shown on FIG. 27b and shows multiple pump-turbine and motor-generator assemblies 1 (here, submersible) installed together in the same borehole 17, around draft tube 211, on bulkhead 140.

Figure 28:
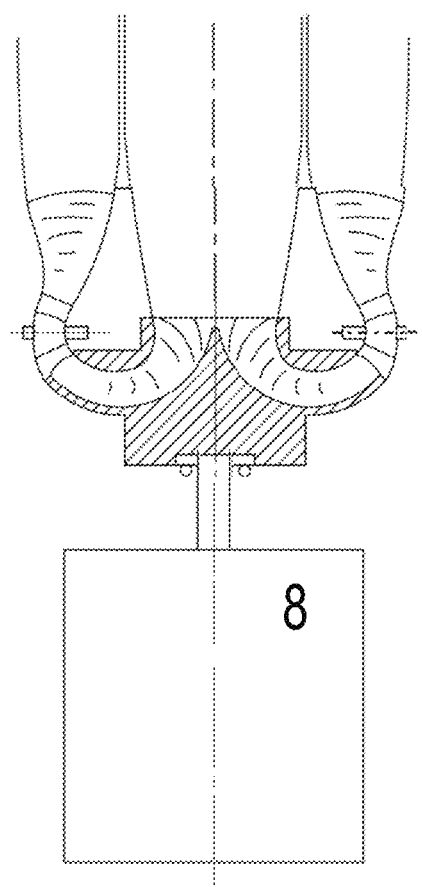
FIG. 28 shows schematically one version of the pump turbine of the present invention.
Figure 29:
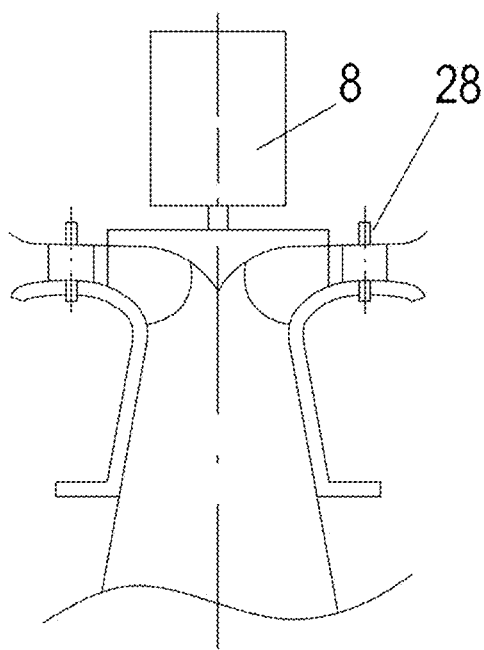
FIG. 29 shows another version of the pump turbine of the present invention.
Figure 30:
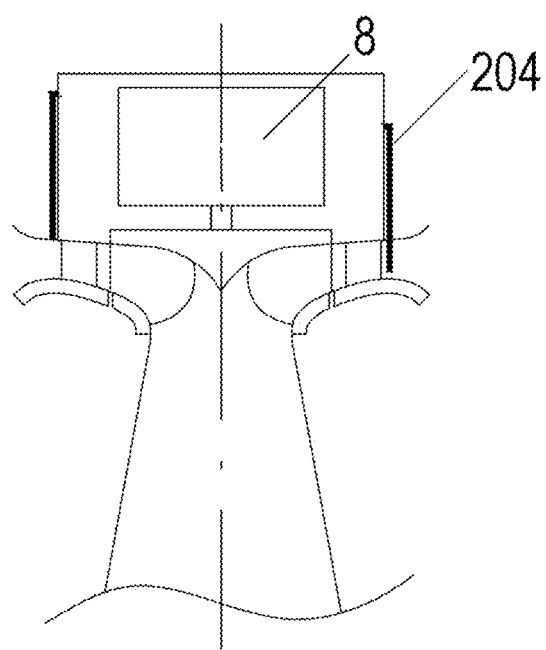
FIG. 30 shows another version of the pump turbine of the present invention incorporating a cylinder gate rather than wicket gates.

FIGS. 28 through 30 show pump-turbines configured for installation on a bulkhead 140 in a common borehole 17. FIG. 30 shows cylinder gate 204 instead of wicket gates.

Figure 31:
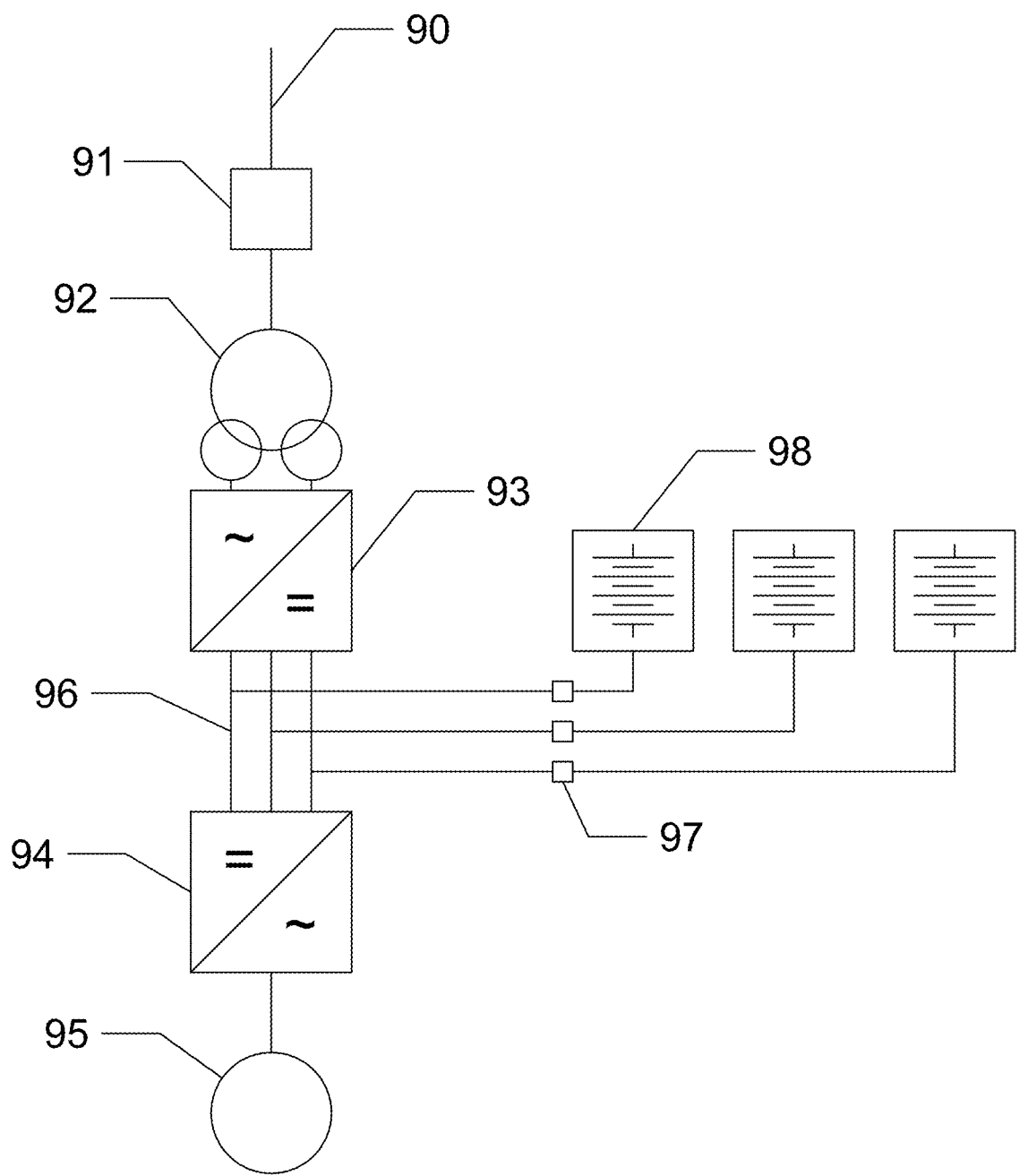
FIGS. 31-37 show various installation alternatives.

Referring to FIG. 31, a motor-generator 95 (e.g., medium/high voltage permanent-magnet motor-generator) and stored power device 98, e.g., battery array, are connected to a utility grid 90 via a single cascade multilevel power converter. The power converter comprises a phase-shifting input transformer 92, power cells incorporating a regenerative-capable front-end 93, DC buses 96, and load-side inverters 94. Each power cell DC bus is connected to a stored power device 98, e.g., battery array, via a disconnect switch 97.

The DC bus 96 voltages are actively managed during operation to charge or discharge the stored power device 98, e.g., battery array, independently of power consumption or generation by the motor-generator 95.

Figure 32:
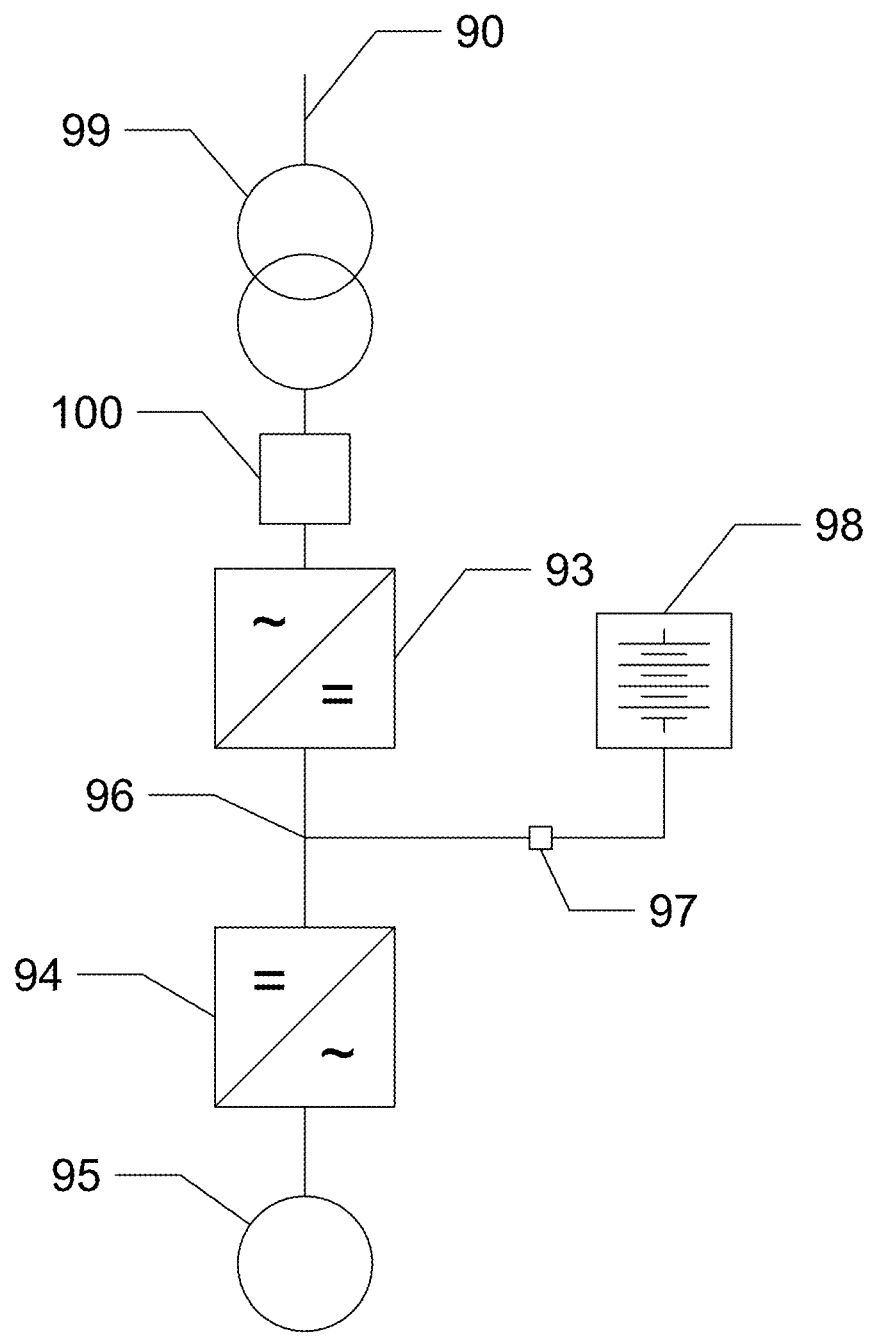

Referring to FIG. 32, motor-generator 95 (e.g., low-voltage permanent-magnet motor-generator) and stored power device 98, e.g., battery array, are connected to a utility grid 90 via a single two-level power converter. The power converter comprises an active front-end with line-side reactor 93, a DC bus 96, and a motor-side two-level inverter 94. The power converter is connected to the grid through a disconnect 100 and step-up transformer 99. The DC bus 96 is attached to a stored power device 98 through a disconnect switch 97. The DC bus 96 voltage is actively managed during operation to charge or discharge the stored power device 98 independently of power consumption or generation by the motor-generator 95.

Figure 33:
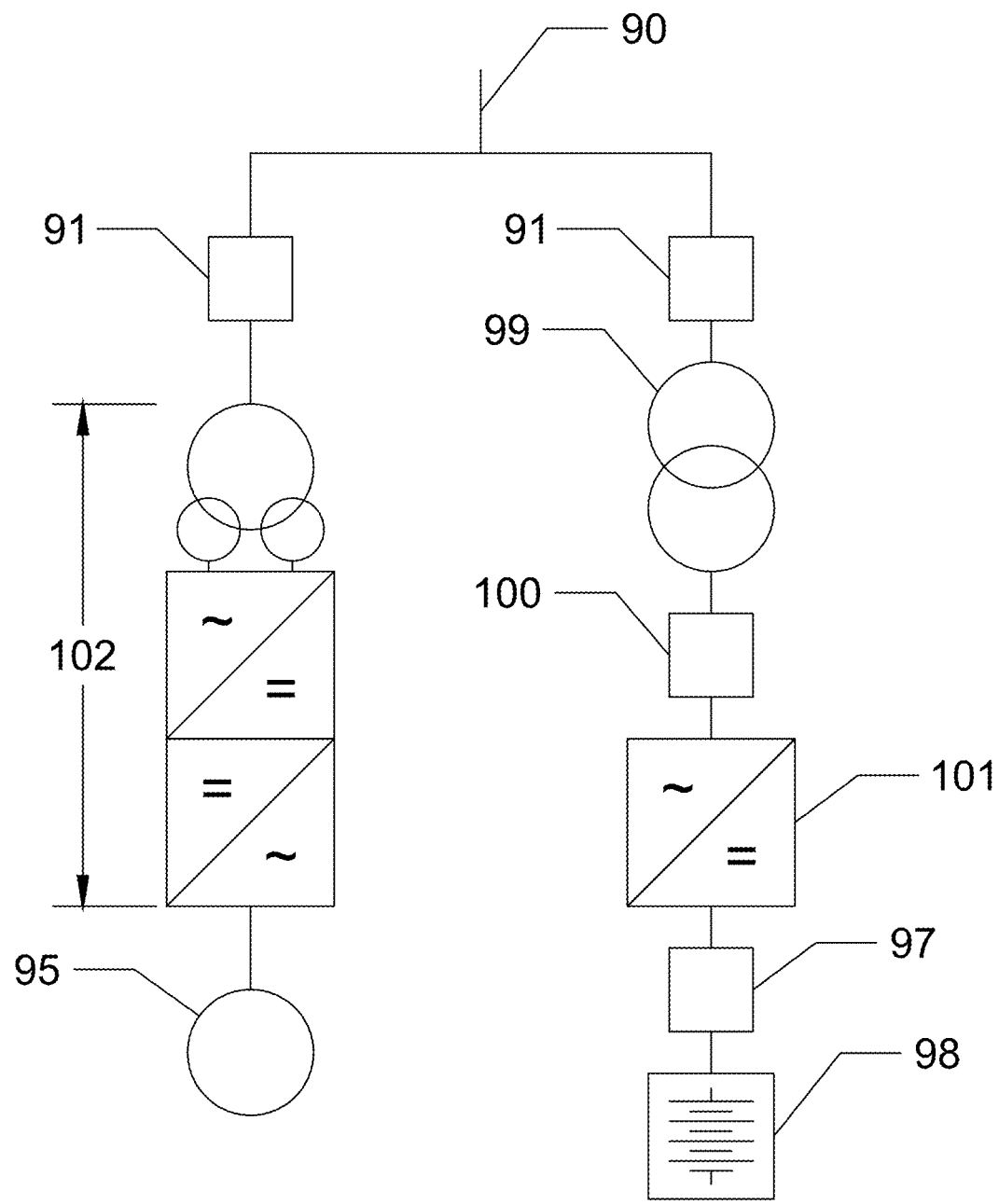

Referring to FIG. 33, a motor-generator 95 (e.g., permanent magnet motor-generator) and stored power device 98 are connected to a utility grid 90 using parallel and independent power converters. The converters may be connected using individual disconnects 91 incorporating protective functions. The motor-generator 95 is connected using a AC/AC power converter 102. The stored power device 98 is connected through DC bus disconnect(s) 97 to a grid-tie inverter 101. A step-up transformer 99 increases inverter 101 output to grid voltage. Optionally, a disconnect 100 is placed between transformer 99 and the battery inverter 101.

Figure 34:
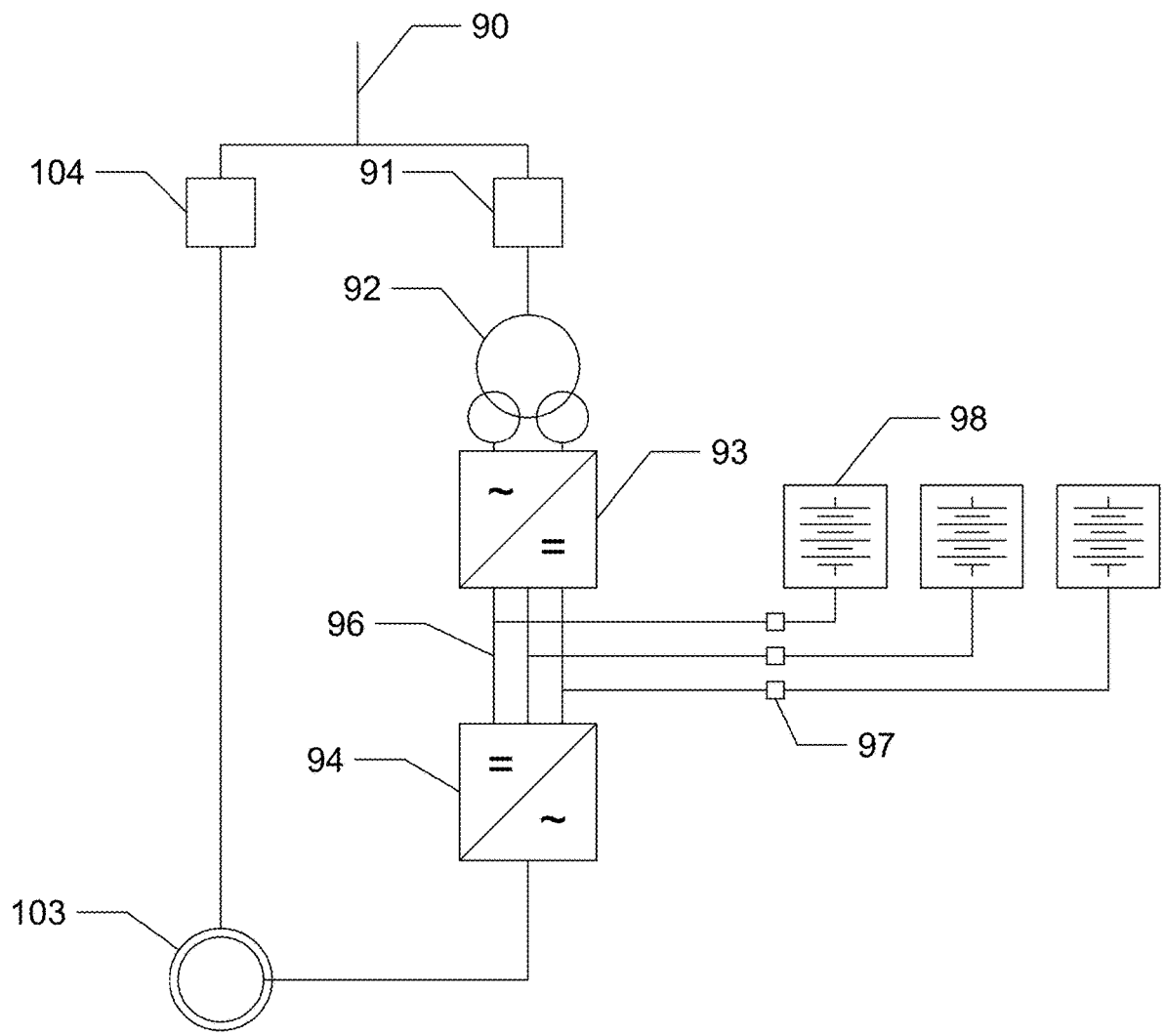

Referring to FIG. 34, a medium/high voltage doubly-fed induction machine 103 and stored power device 98 are connected to a utility grid 90. The rotor windings of the electric machine are connected to a cascade multi-level AC/AC power converter with connected stored power device as described in FIG. 31. The stator windings of the electric machine are connected to the grid through a disconnect 104.

Figure 35:
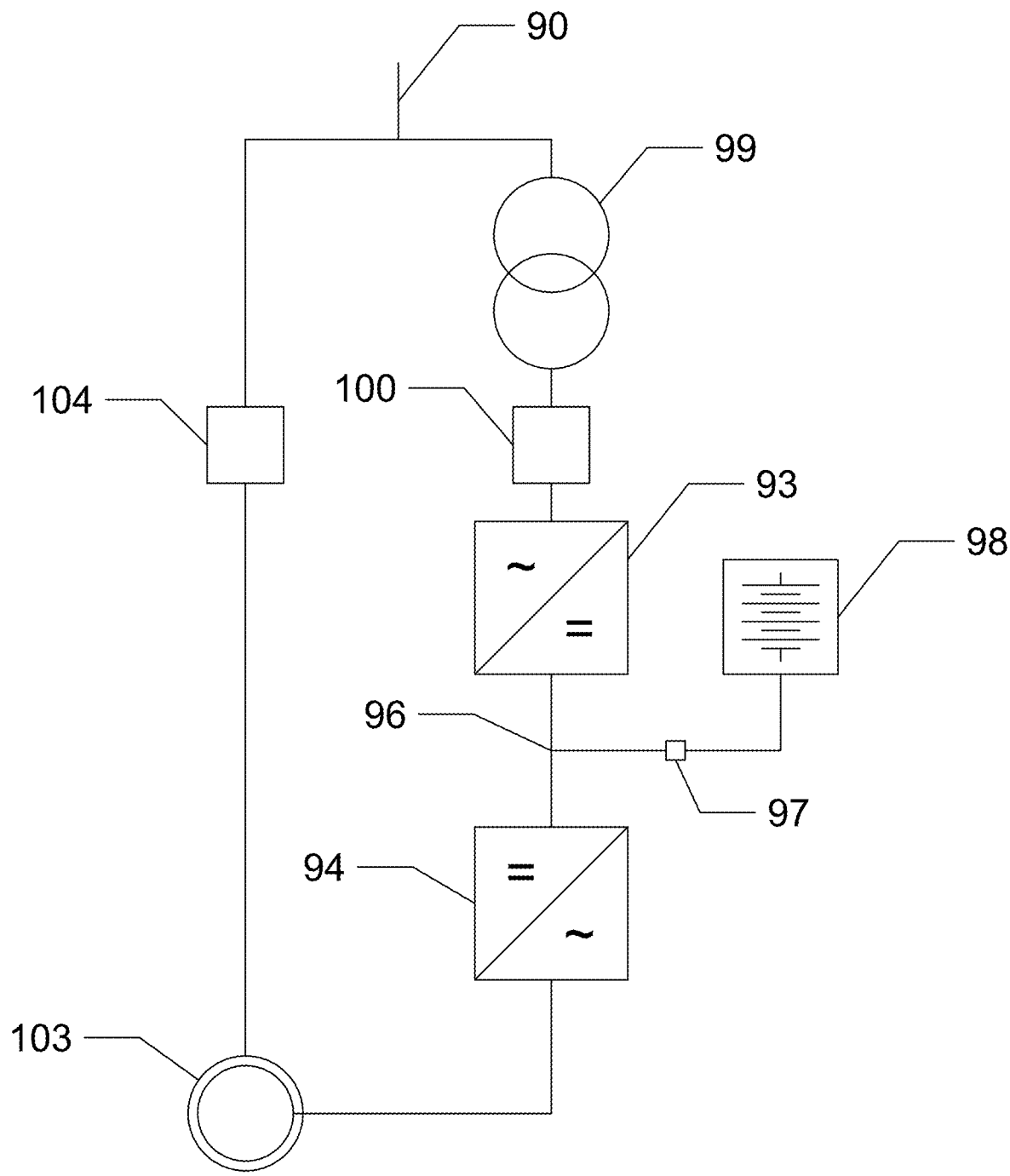

Referring to FIG. 35, a medium/high voltage doubly-fed induction machine 103 and stored power device 98 are connected to a utility grid 90. The rotor windings of the electric machine are connected to a low-voltage two-level AC/AC power converter with connected stored power device as described in FIG. 32. The stator windings of the electric machine are connected to the grid through a disconnect 104.

Figure 36:
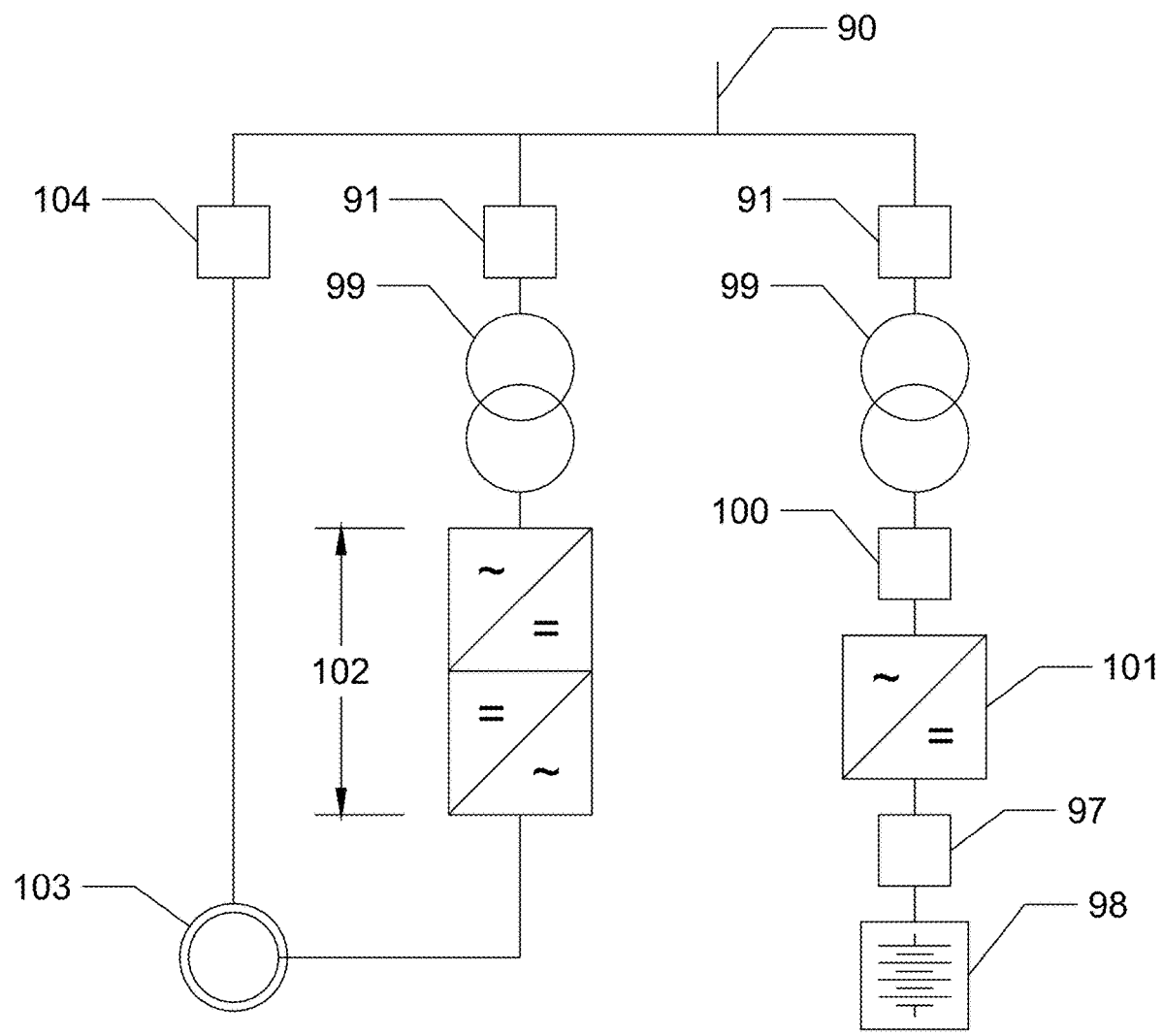

Referring to FIG. 36, a medium/high voltage doubly-fed induction machine 103 and stored power device 98 are connected to a utility grid 90. The rotor windings of the electric machine are connected to AC/AC power converter 102. The stator windings of the electric machine are connected to the grid through a disconnect 104. The stored power device 98 is connected to a separate and independent DC/AC inverter 101 as described in FIG. 33.

Figure 37:
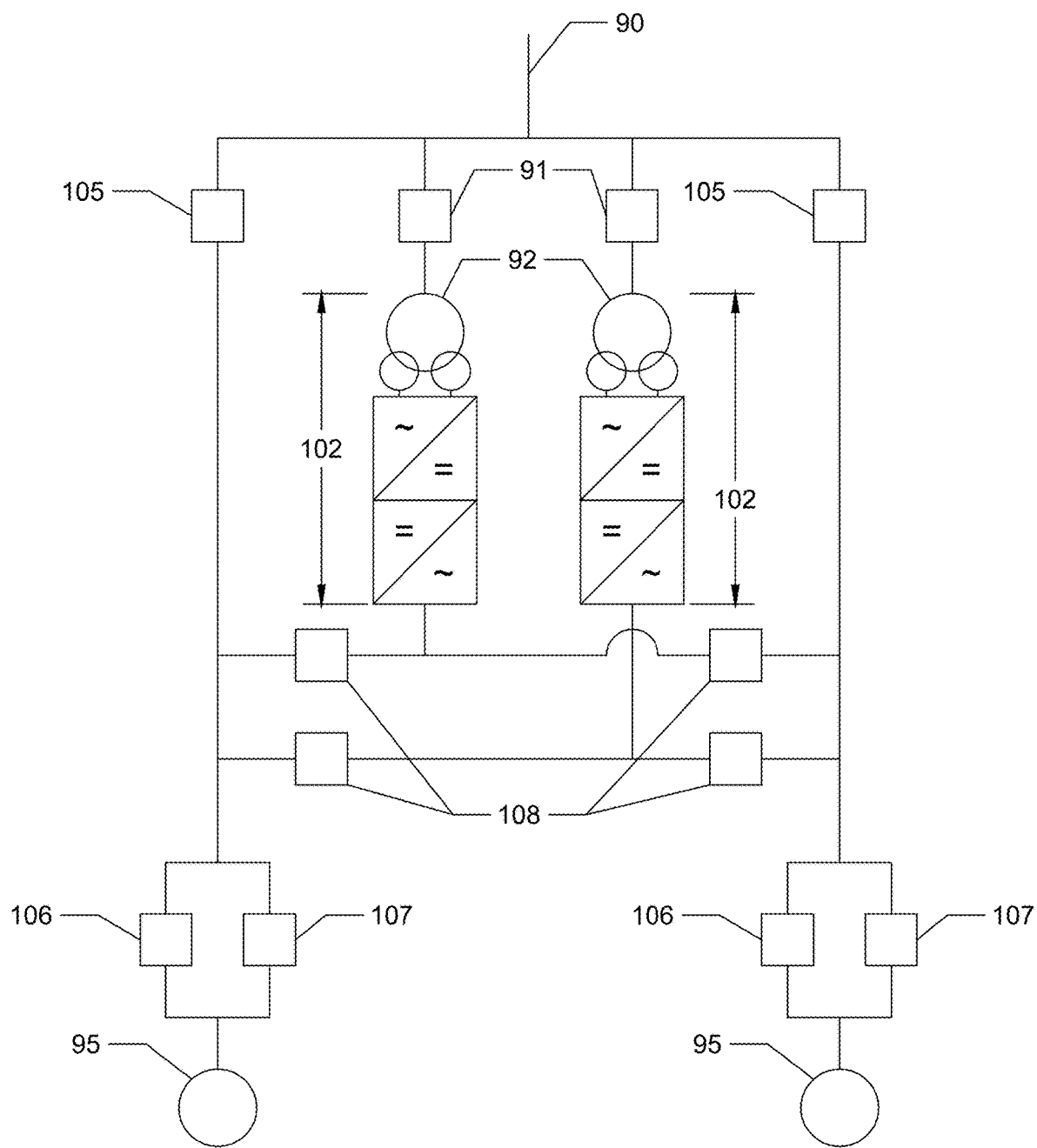

Referring to FIG. 37, multiple motor-generators 95 are connected to a utility grid 90 in an arrangement that allows either direct synchronous connection using direct on-line contactors 105 in conjunction with forward/reverse selecting contactors 106/107, which are interlocked to prevent simultaneous closure. Regenerative power converters 102 can be used to bring the electric machines up to synchronous speed in either the pumping or generating mode, or to operate at variable other-than-synchronous speeds. Phase-shift input transformers 92 connect the active front-end of the converters 102 to the grid via disconnects 91. A matrix of disconnects 108 allows any of the electric machines to be operated or started using any of the power converters.

Figure 38:
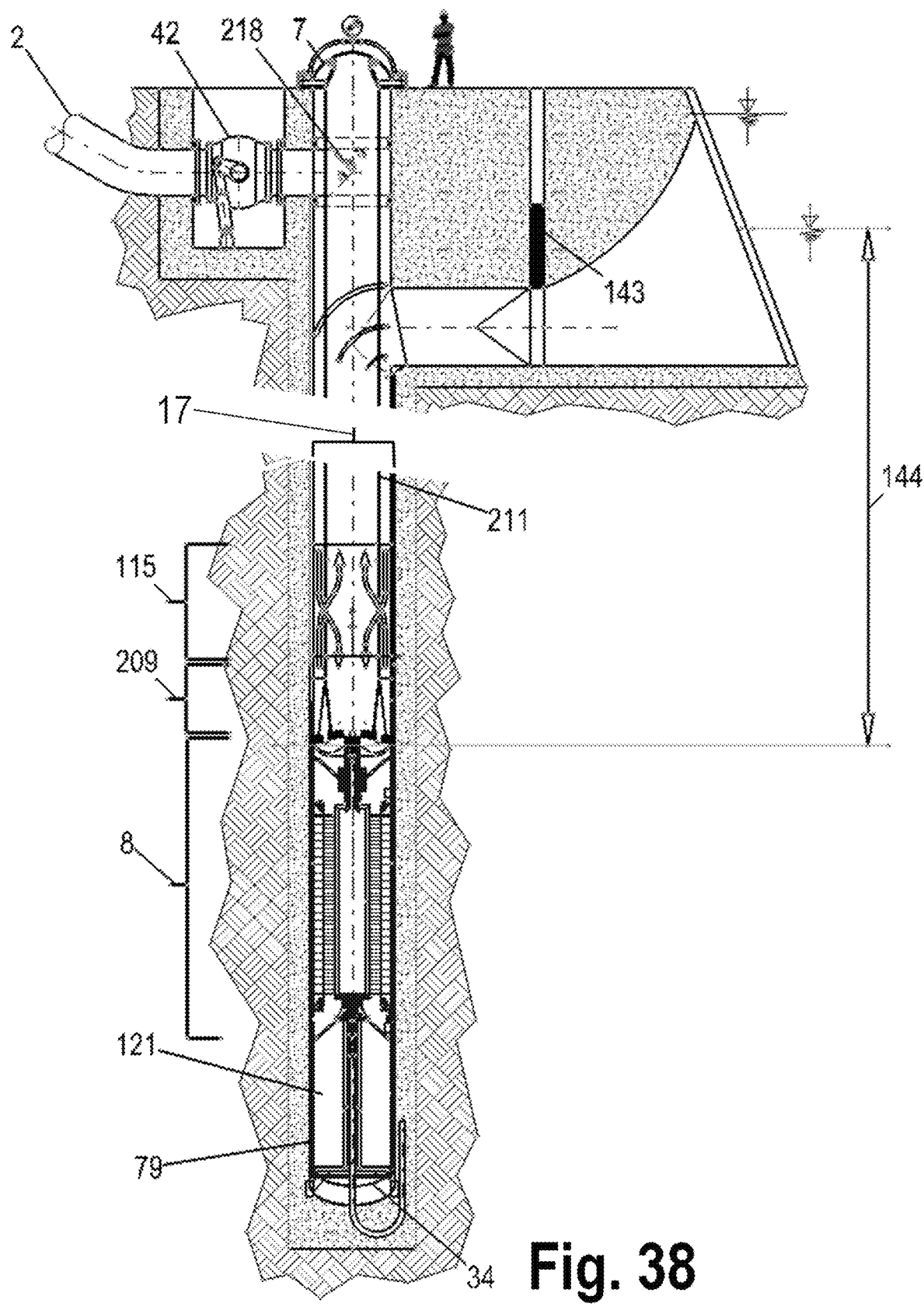
FIGS. 38-43 show various embodiments of a reversible pump turbine

Referring to FIG. 38, a general arrangement drawing of inventive technology is shown. In generating mode, water will flow down the penstock 2 through the stop valve 42 (here, spherical) before being directed through a pitless adapter 218 with guide vanes 89. The water flows down the inner vertical passage until it reaches the flow inverter 115. The flow inverter directs the higher pressure inner passage flow to the outer anulus before the water enters the pump turbine. Below the pump-turbine 37 is the motor-generator 8. An auxiliary equipment enclosure 121 is below the motor-generator 8. The pump-turbine 37 is located below the surface of the lower reservoir by a submersion depth 144. Note also the tailrace gate 143, and pump-turbine diffuser assembly 209.

Figure 39:
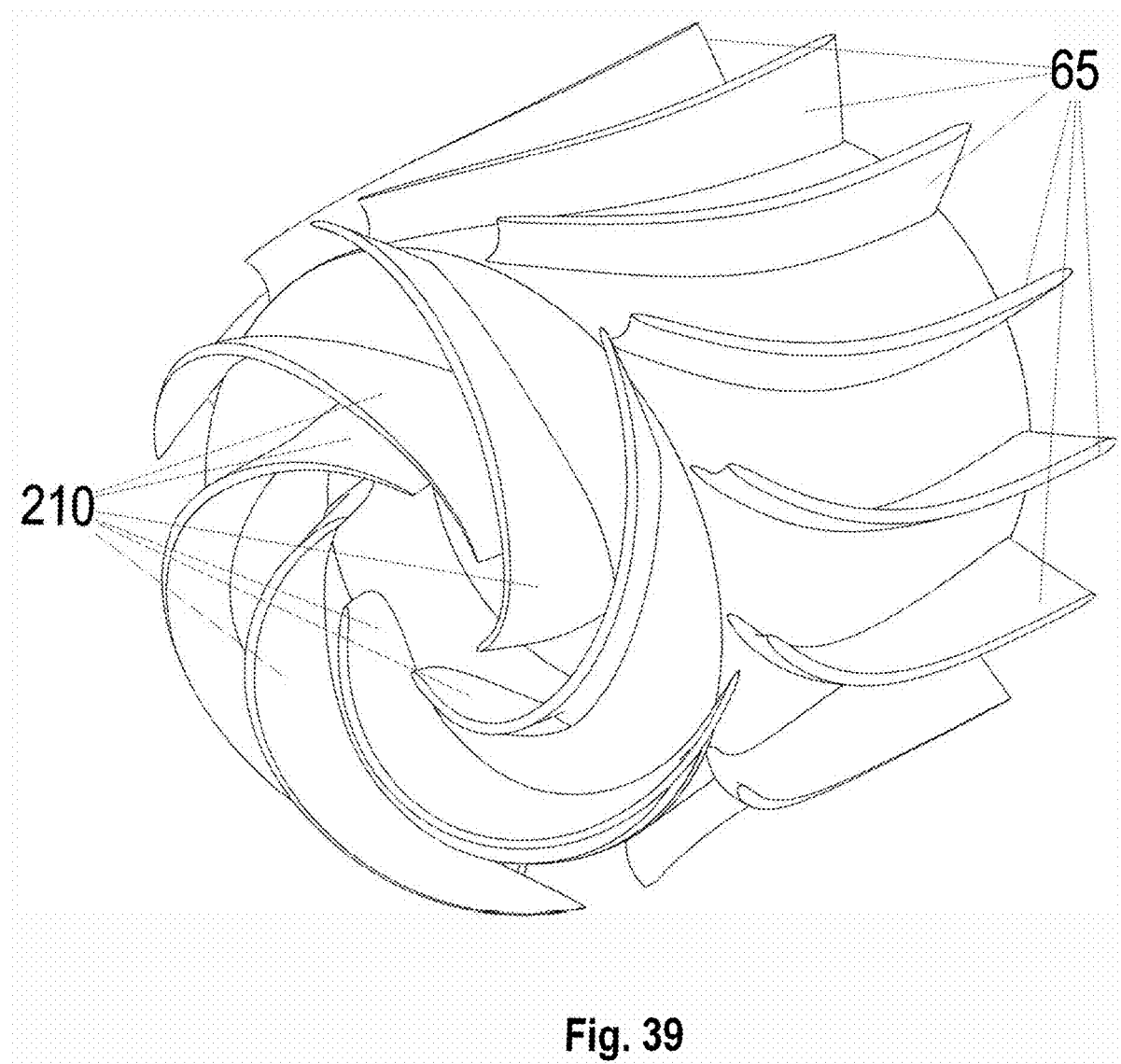

Referring to FIG. 39, an example of the pump turbine runner blades 210 and diffuser vanes 65 is shown.

Figure 40:
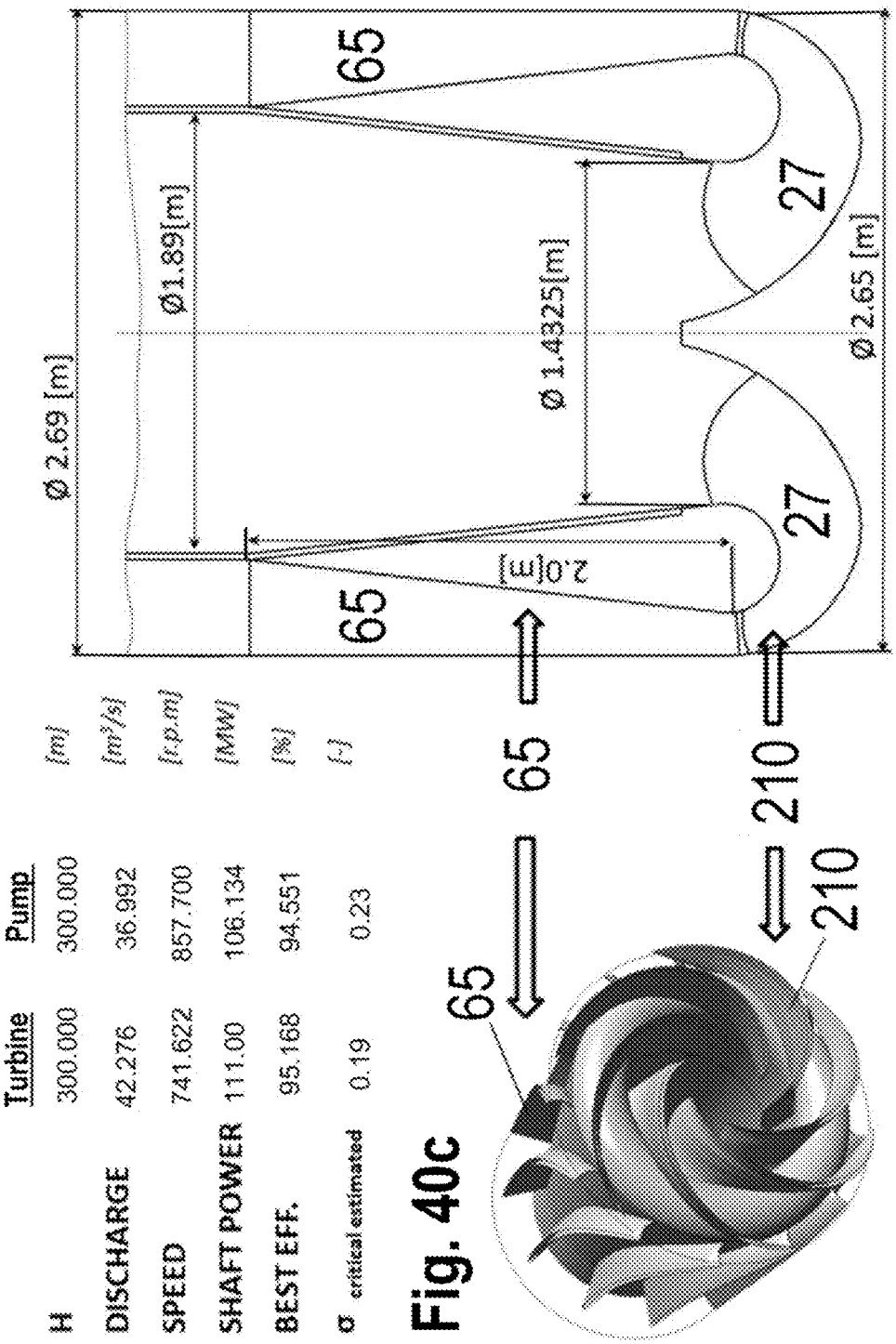

Referring to FIGS. 40a, 40b and 40c, an embodiment of the invention is shown with analytically predicted performance parameters listed in FIG. 40c. FIG. 40a shows a meridional-section drawing of the runner 27, with blades 210, and diffuser vanes 65. FIG. 40b shows a 3D model of the runner 27 and diffuser vanes 65.

Figure 41:
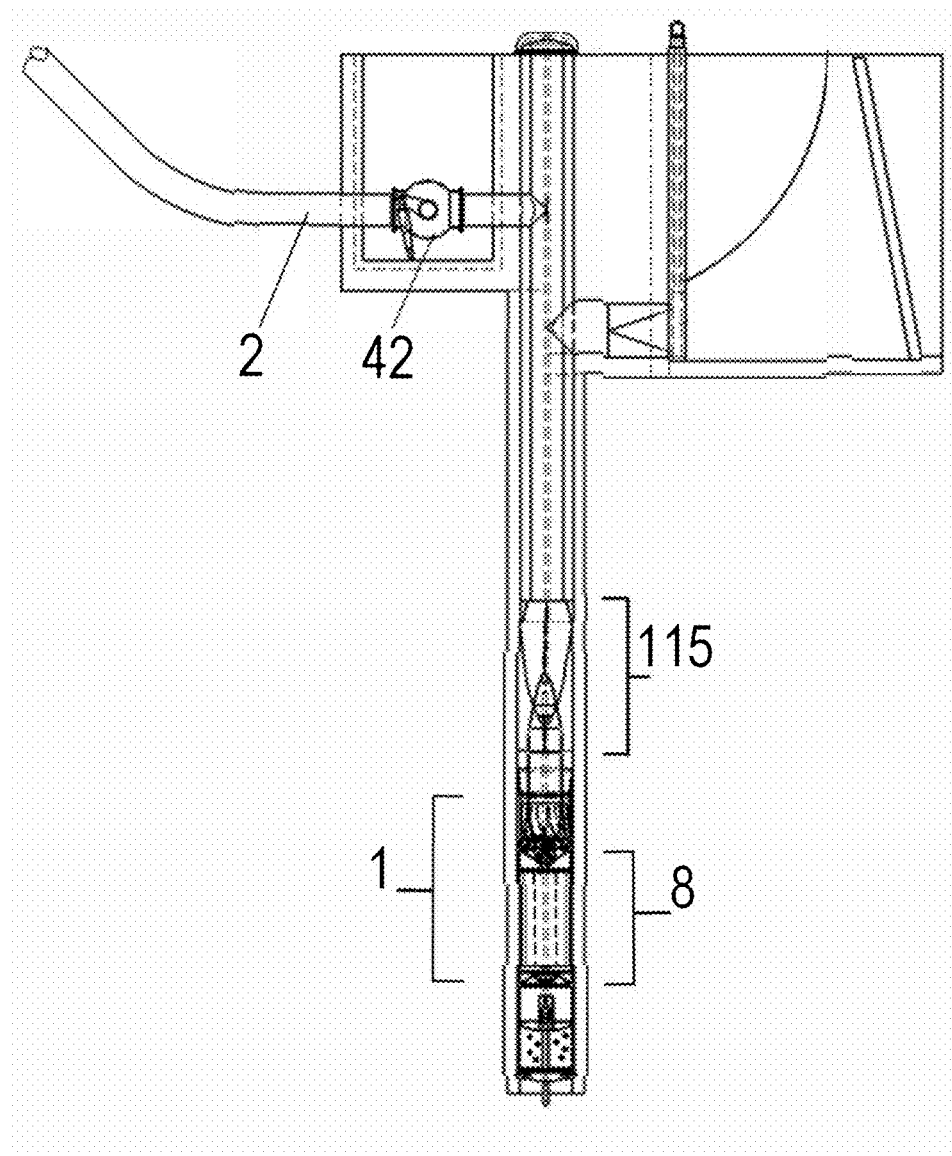

FIG. 41 shows an embodiment of the invention with a secondary hoisting piston 88.

Figure 42A:
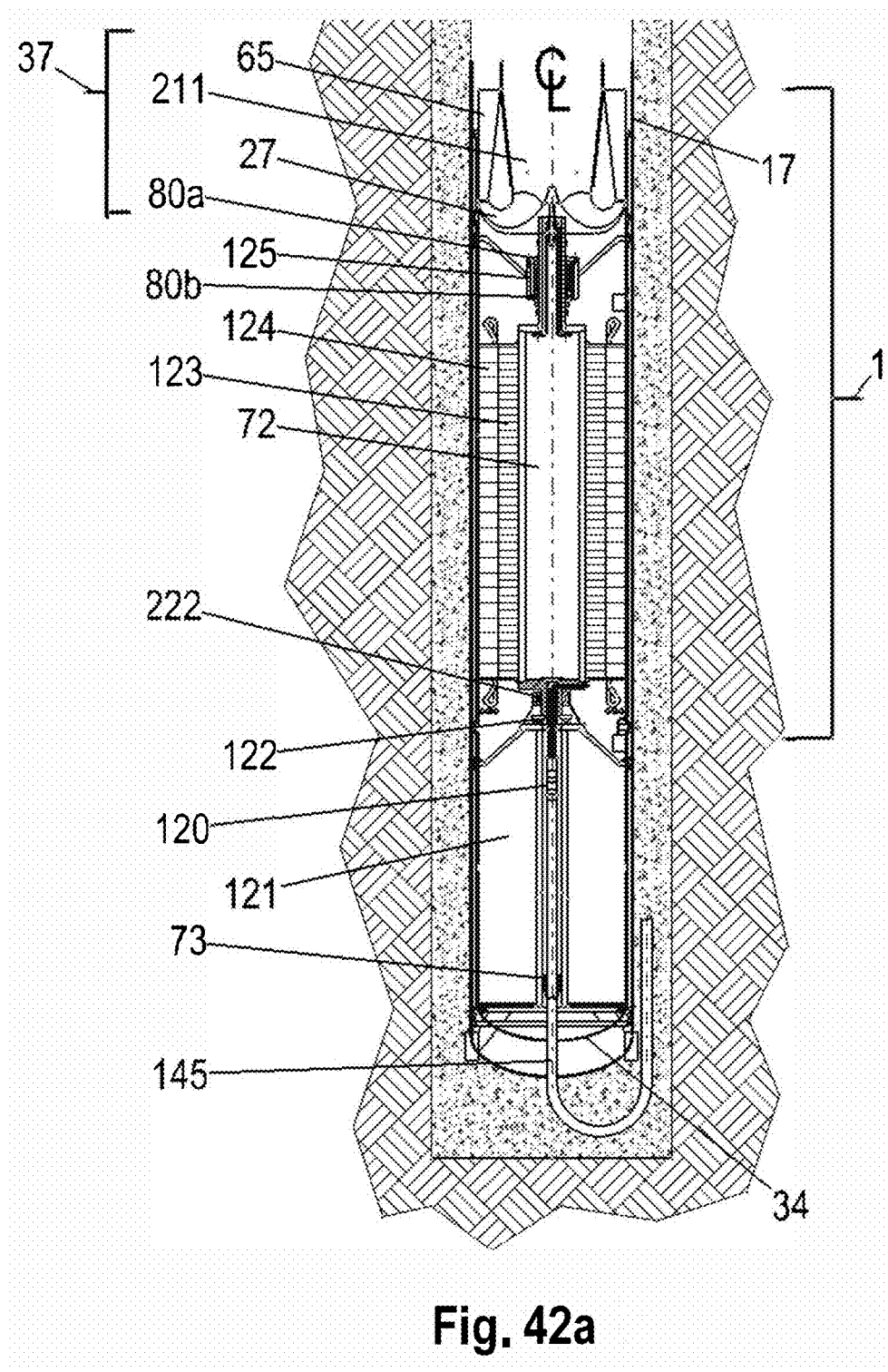

Referring to FIG. 42a, a reversible pump turbine is illustrated in its operating position at the bottom of borehole 17. Main power conduit 145 carries electrical power into main power connector 73, preferably located within auxiliary equipment enclosure 121. Slip rings 120 (if used) are also preferably located within auxiliary equipment enclosure 121. Thrust bearing 122 and lower guide bearing 222 are shown above auxiliary equipment enclosure 121. Motor/generator rotor 123 may include a heat pipe (e.g., hollow motor-generator shaft) 72 from which evaporated working fluid evaporated within rotor 123 rises to condense within runner 27. Stator 124 and rotor 123 are isolated from water by outboard shaft seal 80a, upper guide bearing 125, and inboard shaft seal 80b. In pumping mode runner 27 accepts water from draft tube 211 and discharges it through pump diffuser vanes 65. In generating mode runner 27 accepts water from pump diffuser vanes 65 and discharges it into draft tube 211. Note that wicket gates 28, as shown in FIGS.

5a and 5b, may also be incorporated and used to modulate generating flow and power output.

Figure 42B:
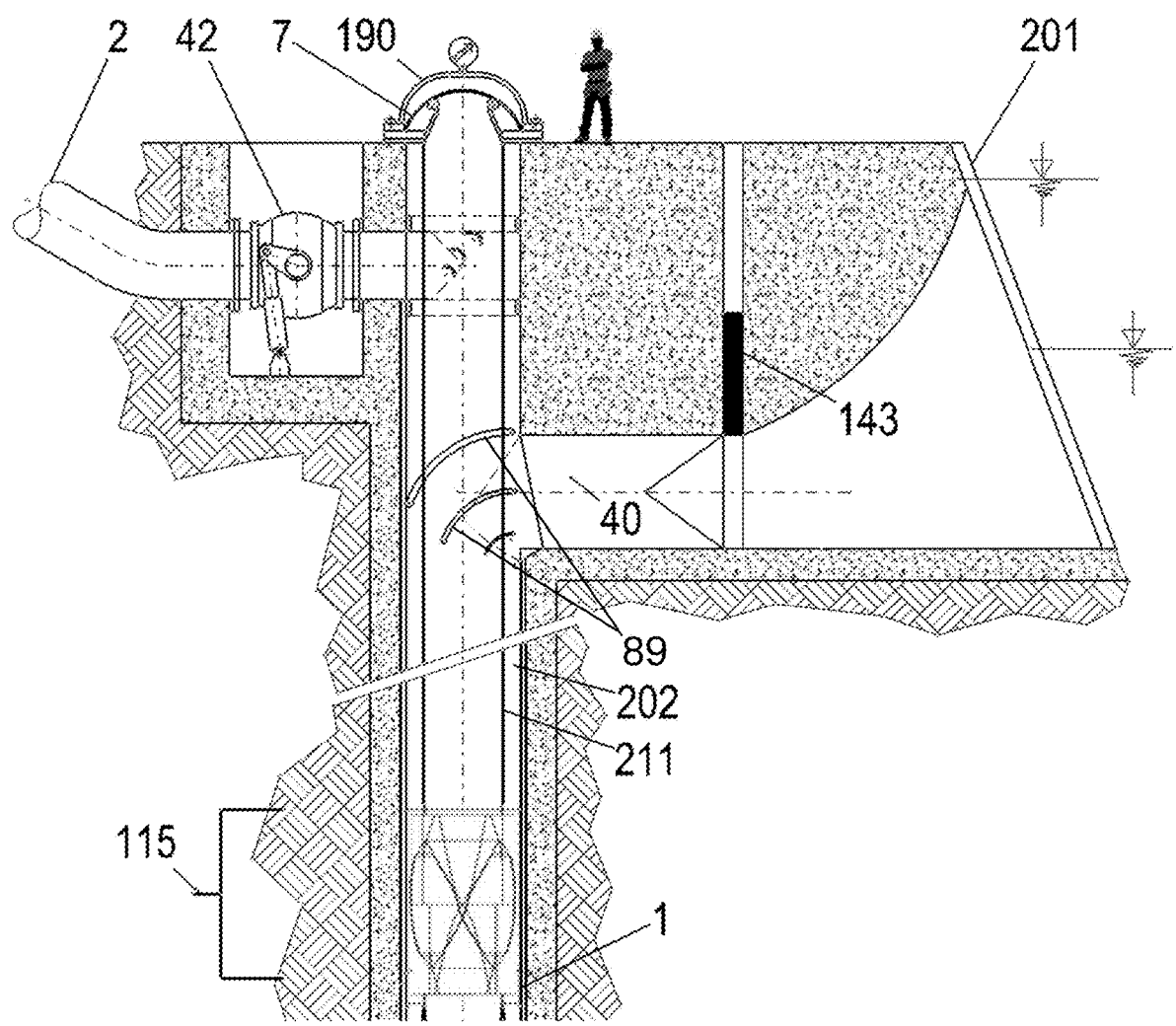

Referring to FIG. 42b, which, when stacked atop FIG. 42a, shows the vertical extent of a pump turbine installation, shows flow inverter 115, preferably located directly above pump-turbine and motor-generator assembly 1, directs high pressure flow from penstock 2 to the outer high pressure water passageway of pump-turbine 37 and through diffuser vanes 65. Tailwater guide vanes 89 guide water between tailrace conduit 40 and the annulus 202. This arrangement places the higher pressure water within, rather than outside of, penstock 2, and thus eliminates external pressure from penstock 2 which would otherwise require that it have a heavier wall thickness in order to resist buckling. Air balanced pressure relief valve 7 relieves high penstock pressure that occurs during load rejection to the tailrace conduit via annulus 202. FIG. 42b also shows trash screen 201 and tailrace gate 143.

Figure 43:
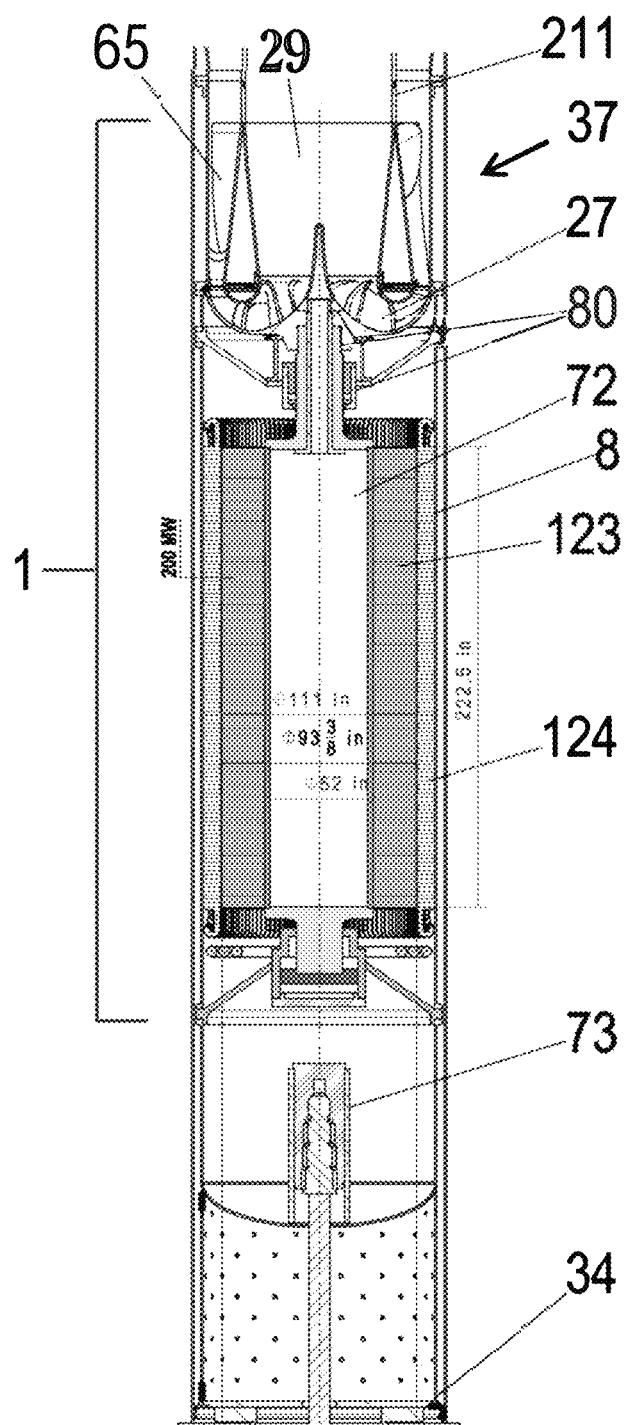

Referring to FIG. 43, a submersible reversible pump-turbine 37 in accordance with the present invention is shown. Draft tube 211, which serves as a diffuser 29 in generating mode and serves as an inlet nozzle in pumping mode, is located inside of the diffuser 29 with vanes 65. Runner 27 is attached to shaft with motor-generator shaft 72 (and heat pipe) that supports motor/generator rotor 123. Motor/generator stator 124 may be conduction cooled to the water surrounding the pump-turbine and motor-generator assembly 1. Electrical power may be conveyed to and from the machine through electrical connector 73.

Figure 44A:
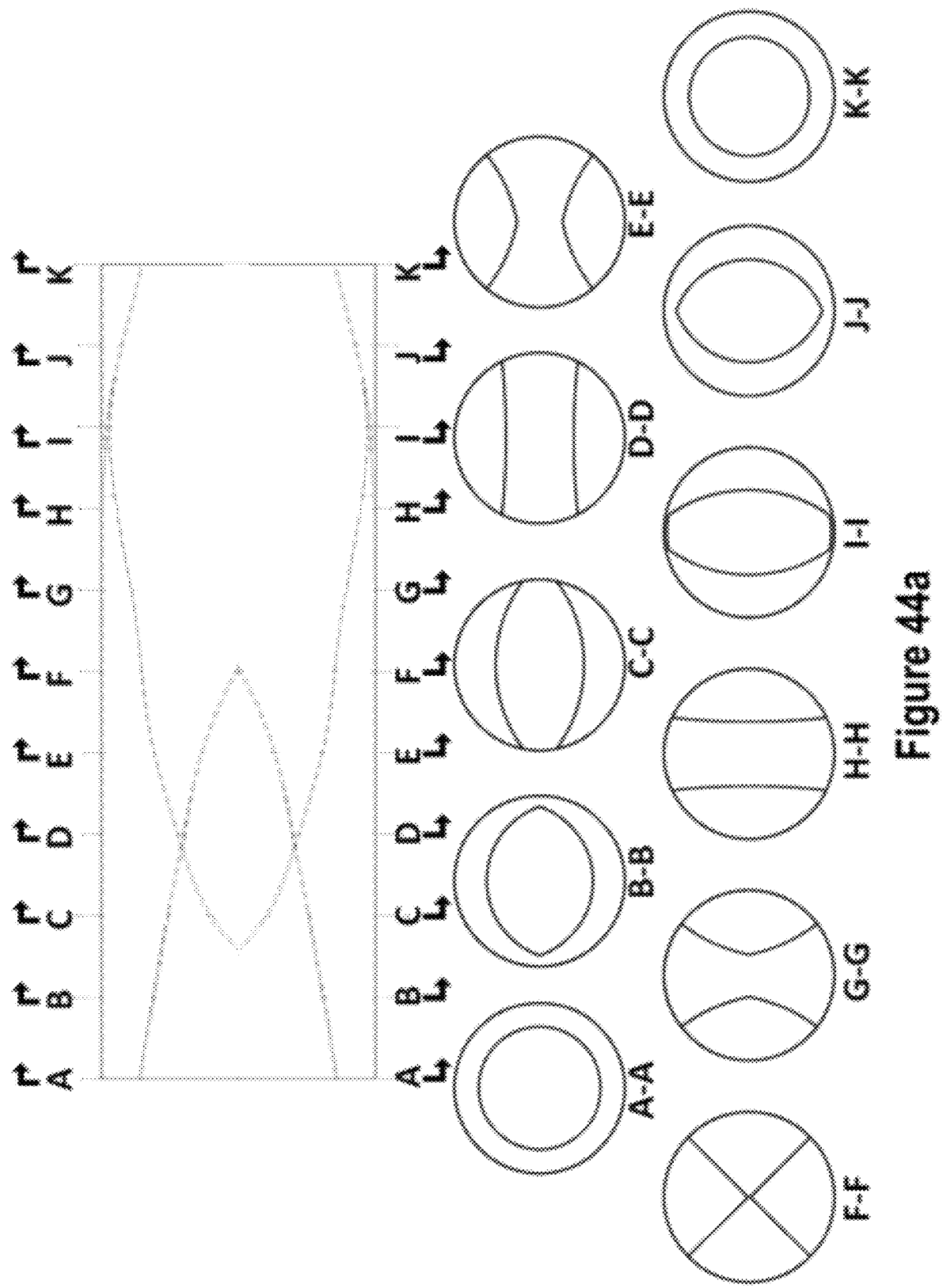
FIGS. 44a-b show a flow inverter section.

Referring to FIG. 44a, the geometry of a flow inverter 115 in accordance with the present invention is illustrated by way of cross sections A-A through K-K. As can be seen by the smooth transition between adjacent cross sections, the water passageways thus formed result in minimal head loss during the process of moving the inner passageway in the center of section A-A to the outer annulus of section K-K, while moving the flow in the outer annulus in section A-A to the inner passageway in the center of section K-K. The cross sections of each flow path may be kept uniform across the length of the flow inverter while pressure gradients may be minimized to prevent flow separation and attendant head loss.

Figure 44B:
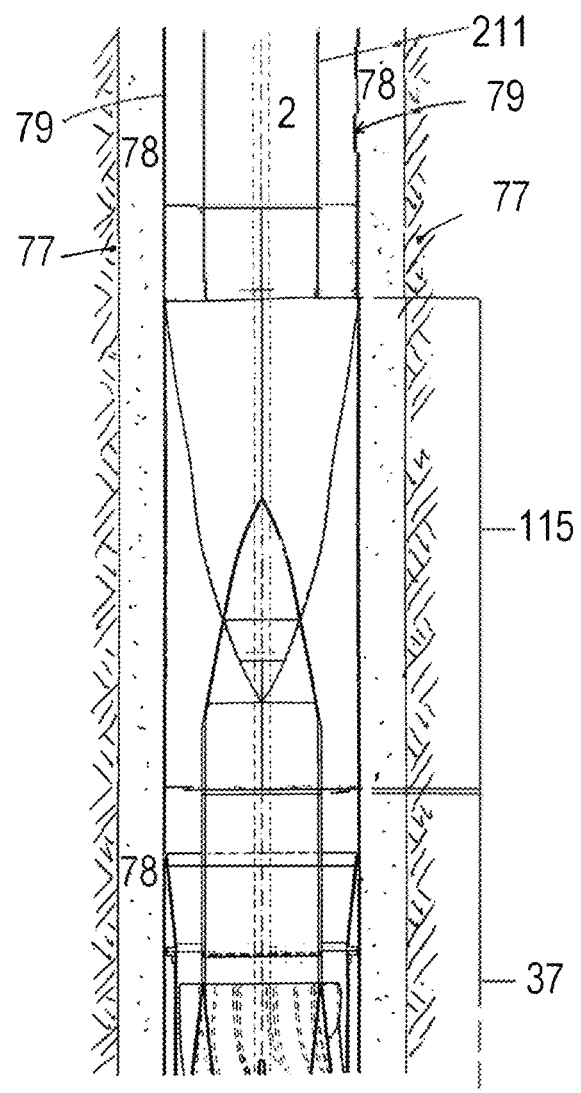

Referring to FIG. 44b, a flow inverter in accordance with the present invention is shown in its preferred position relative to penstock 2 and pump turbine 37.

Figure 45:
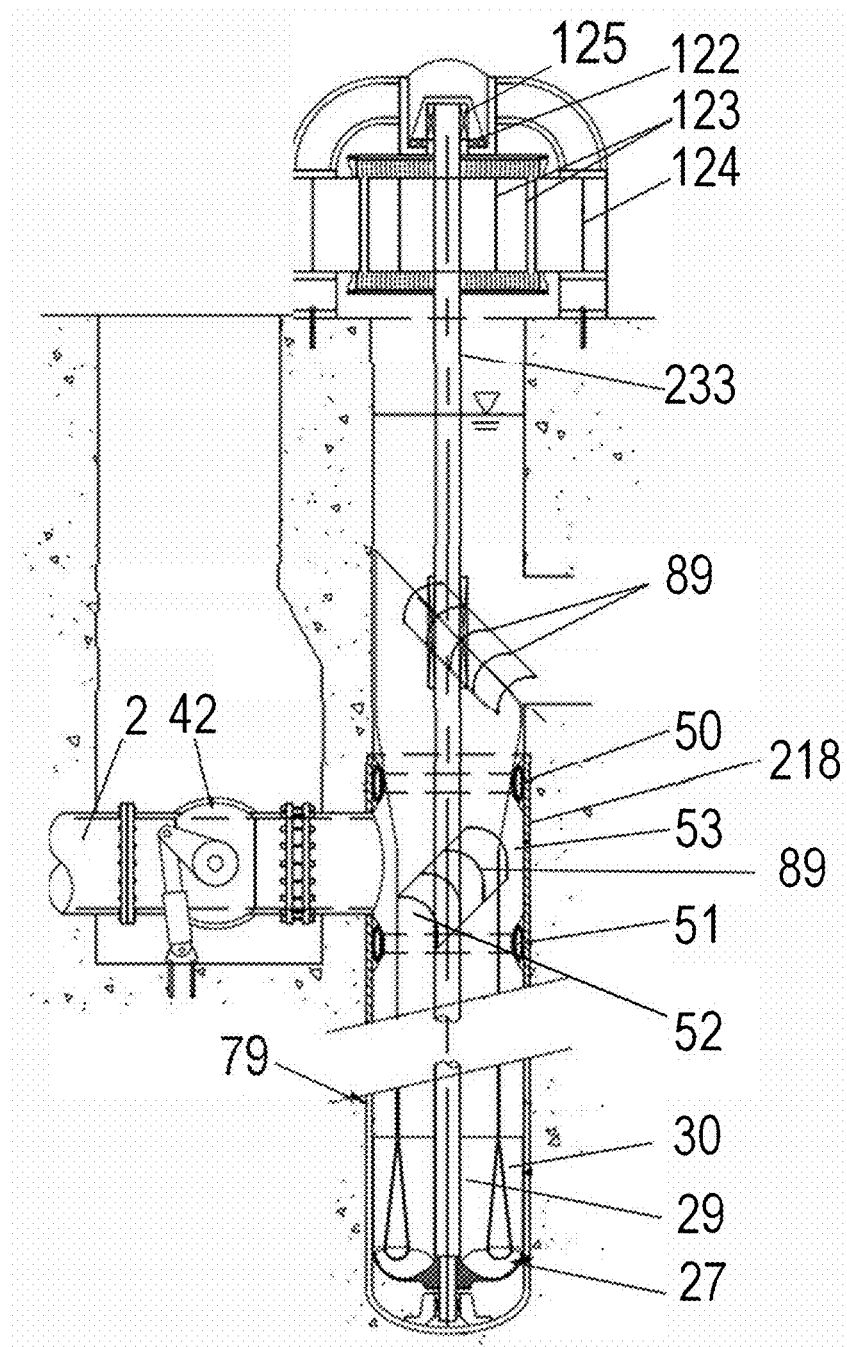
FIG. 45 shows a reversible pump-turbine and motor-generator assembly in accordance with the present invention, with a prior art vertical air-cooled motor-generator located above.

Referring to FIG. 45, a reversible pump-turbine and motor-generator assembly 1 in accordance with the present invention is shown with a prior art vertical air-cooled motor-generator located above (instead of submerged). This configuration provides submergence to the runner 27 while not requiring a submersible generator and associated mechanical shaft seals, in addition to not requiring a large volume of excavation of concrete placement. Stop valve 42 (here, spherical) controls flow into borehole 17 with pressure tight liner 79. Pump turbine shaft 233 connects runner 27 with generator rotor 123. Generator stator 124 is preferably of sufficiently large diameter to allow removal of runner 27 for service without removal of generator stator 124. Guide bearings 125 may be water lubricated. A pitless adaptor 218 may be used to seal the draft tube 211 and tailrace guide vanes 89 within the borehole.

Figure 46A:
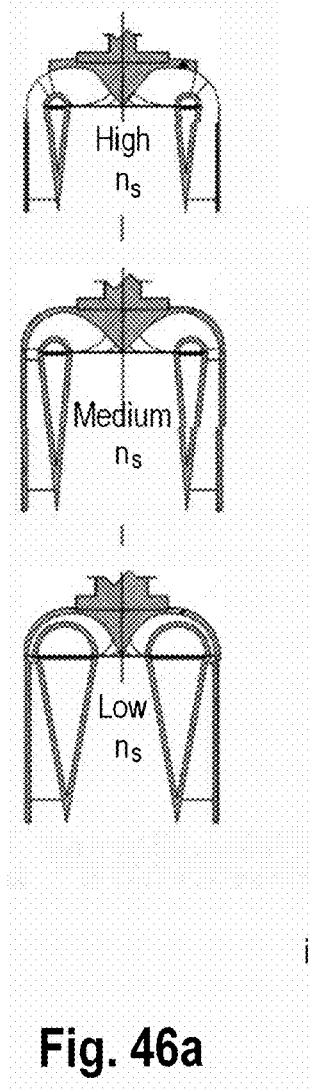
FIG. 46a shows various meridional sections of the pump turbine runner at high, medium, and low specific speed embodiments thereof, in accordance with the present invention.
Figure 46B:
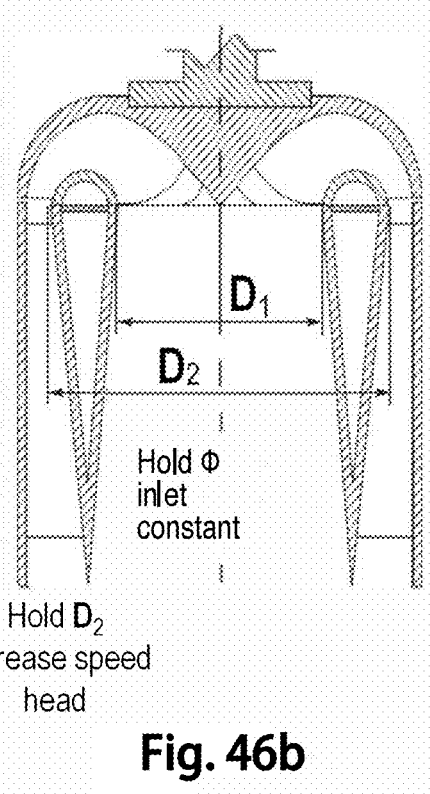
FIG. 46b shows a meridional section of a pump turbine runner as may appear in particular embodiments of the invention.

Referring to FIG. 46a, meridional sections of high, medium, and low specific speed embodiments of the pump turbine runner in accordance with the present invention are shown. FIG. 46b shows a meridional section of the medium specific speed embodiment.

As can be easily understood from the foregoing, the basic concepts of the present invention may be embodied in a variety of ways. It involves both water control and actuator techniques as well as devices to accomplish the appropriate water control or actuation. In this application, the water control techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims included in this patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon for the claims for this patent application. It should be understood that such language changes and broad claiming is accomplished in this filing. This patent application will seek examination of as broad a base of claims as deemed within the applicant's right and will be designed to yield a patent covering numerous aspects of the invention both independently and as an overall system.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "means for actuating" or an "actuator" should be understood to encompass disclosure of the act of "actuating"—whether explicitly discussed or not—and, conversely, were there effectively disclosure of the act of "actuating", such a disclosure should be understood to encompass disclosure of an "actuator" and even a "means for actuating". Such changes and alternative terms are to be understood to be explicitly included in the description.

In accordance with the materials incorporated by reference herewith and in conjunction with industry practice, the rotating element of a pump, blower, or compressor that imparts work to the fluid is generally referred to as an "impeller" and the rotating element of a turbine that extracts work from the fluid is generally called a "runner" or "turbine wheel". These terms may be used interchangeably in the case of reversible machines that may run in either direction (as pump or turbine).

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s). Please be aware that cited works of non-patent literature such as scientific or technical documents or the like may be subject to copyright protection and/or any other protection of written works as appropriate based on applicable laws. Copyrighted texts may not be copied or used in other electronic or printed publications or re-distributed without the express permission of the copyright holder.

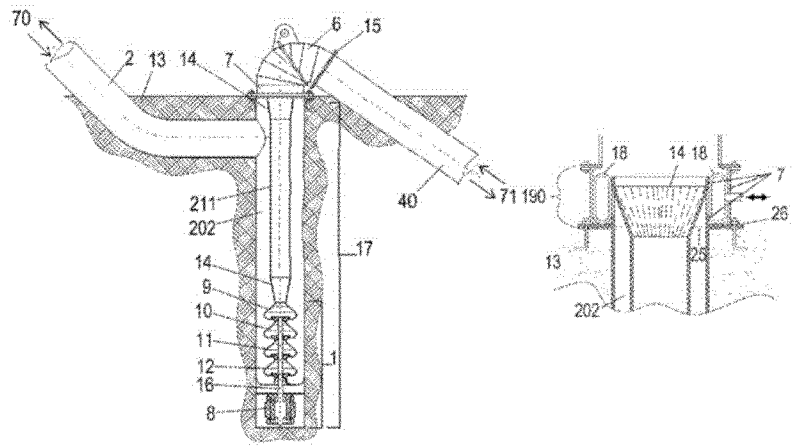

What is claimed is:

1. A pumped storage system comprising:
   an upper water storage basin,
   a lower water storage basin,
   a reversible pump-turbine connected to said upper water storage basin by a penstock conduit and also connected to said lower water storage basin by means of a tail water conduit, and
   a motor-generator operably connected to said pump-turbine;

wherein said pump-turbine comprises multiple stages, wherein said pump turbine is positioned in a vertical borehole at an elevation below the surface of said lower water storage basin, and wherein said pump-turbine is axially removable from said vertical borehole;

said system further comprising a removable manifold fixed to the top of said vertical borehole during operation, wherein said removable manifold includes a pressure relief valve for relieving excess head pressure to said tail water conduit, and wherein said pressure relief valve comprises an elastomeric diaphragm held by controlled gas pressure against one or more orifices containing headwater pressure.

2. A pumped storage system as described in claim 1, wherein said penstock conduit and said tail water conduit are coaxially positioned in said vertical borehole above said pump-turbine.

3. A pumped storage system as described in claim 2, wherein said motor-generator is positioned below said pump-turbine.

4. A pumped storage system as described in claim 3, wherein said coaxial conduits comprise an inner conduit and an outer conduit, and wherein said removable manifold is adapted to direct water in said inner conduit to said lower water storage basin and for directing water from said upper water storage basin to said penstock conduit.

5. A pumped storage system as described in claim 1, further comprising a hoisting piston positioned below said pump-turbine for selectively raising and lowering said pump-turbine in said vertical borehole.

6. A pumped storage system having an upper water storage basin, a lower water storage basin, and a reversible pump-turbine connected to said upper water storage basin by a penstock conduit and also connected to said lower water storage basin by means of a tail water conduit, wherein said pump-turbine is positioned in a vertical borehole at an elevation below the surface of said lower water storage basin; wherein said pump-turbine is axially removable from said vertical borehole; wherein said conduits are coaxially positioned in said vertical borehole; further comprising a removable manifold fixed to the top of said vertical borehole during operation; wherein said removable manifold includes a pressure relief valve for relieving excess head pressure; wherein said pressure relief valve comprises an elastomeric diaphragm held by controlled gas pressure against one or more orifices containing headwater pressure.

* * * * *

UNITED STATES PATENT AND TRADEMARK OFFICE
CERTIFICATE OF CORRECTION

PATENT NO. : 11,300,093 B2
APPLICATION NO. : 16/322185
DATED : April 12, 2022
INVENTOR(S) : Henry K. Obermeyer et al.

It is certified that error appears in the above-identified patent and that said Letters Patent is hereby corrected as shown below:

On the Title Page

Please replace the Title Page with the attached Title Page showing the corrected number of drawing sheets.

In the Drawings

"Sheet 1 of 45" should read --Sheet 1 of 46--;
"Sheet 2 of 45" should read --Sheet 2 of 46--;
"Sheet 3 of 45" should read --Sheet 3 of 46--;
"Sheet 4 of 45" should read --Sheet 4 of 46--;
"Sheet 5 of 45" should read --Sheet 5 of 46--;
"Sheet 6 of 45" should read --Sheet 6 of 46--;
"Sheet 7 of 45" should read --Sheet 7 of 46--;
Insert Sheet 8 of 46, Fig. 5c;
"Sheet 8 of 45" should read --Sheet 9 of 46--;
"Sheet 9 of 45" should read --Sheet 10 of 46--;
"Sheet 10 of 45" should read --Sheet 11 of 46--;
"Sheet 11 of 45" should read --Sheet 12 of 46--;
"Sheet 12 of 45" should read --Sheet 13 of 46--;
"Sheet 13 of 45" should read --Sheet 14 of 46--;
"Sheet 14 of 45" should read --Sheet 15 of 46--;
"Sheet 15 of 45" should read --Sheet 16 of 46--;
"Sheet 16 of 45" should read --Sheet 17 of 46--;
"Sheet 17 of 45" should read --Sheet 18 of 46--;
"Sheet 18 of 45" should read --Sheet 19 of 46--;
"Sheet 19 of 45" should read --Sheet 20 of 46--;
"Sheet 20 of 45" should read --Sheet 21 of 46--;
"Sheet 21 of 45" should read --Sheet 22 of 46--;
"Sheet 22 of 45" should read --Sheet 23 of 46--;

Signed and Sealed this
Eleventh Day of March, 2025

Coke Morgan Stewart
*Acting Director of the United States Patent and Trademark Office*

CERTIFICATE OF CORRECTION (continued)
U.S. Pat. No. 11,300,093 B2

"Sheet 23 of 45" should read --Sheet 24 of 46--;
"Sheet 24 of 45" should read --Sheet 25 of 46--;
"Sheet 25 of 45" should read --Sheet 26 of 46--;
"Sheet 26 of 45" should read --Sheet 27 of 46--;
"Sheet 27 of 45" should read --Sheet 28 of 46--;
"Sheet 28 of 45" should read --Sheet 29 of 46--;
"Sheet 29 of 45" should read --Sheet 30 of 46--;
"Sheet 30 of 45" should read --Sheet 31 of 46--;
"Sheet 31 of 45" should read --Sheet 32 of 46--;
"Sheet 32 of 45" should read --Sheet 33 of 46--;
"Sheet 33 of 45" should read --Sheet 34 of 46--;
"Sheet 34 of 45" should read --Sheet 35 of 46--;
"Sheet 35 of 45" should read --Sheet 36 of 46--;
"Sheet 36 of 45" should read --Sheet 37 of 46--;
"Sheet 37 of 45" should read --Sheet 38 of 46--;
"Sheet 38 of 45" should read --Sheet 39 of 46--;
"Sheet 39 of 45" should read --Sheet 40 of 46--;
"Sheet 40 of 45" should read --Sheet 41 of 46--;
"Sheet 41 of 45" should read --Sheet 42 of 46--;
"Sheet 42 of 45" should read --Sheet 43 of 46--;
"Sheet 43 of 45" should read --Sheet 44 of 46--;
"Sheet 44 of 45" should read --Sheet 45 of 46--; and
"Sheet 45 of 45" should read --Sheet 46 of 46--.

(12) United States Patent
Obermeyer et al.

(10) Patent No.: US 11,300,093 B2
(45) Date of Patent: Apr. 12, 2022

(54) REVERSIBLE PUMP-TURBINE INSTALLATION

(71) Applicant: Henry K. Obermeyer, Wellington, CO (US)

(72) Inventors: Henry K. Obermeyer, Wellington, CO (US); Claudiu M. Iavornic, Fort Collins, CO (US); Grant Quinn Baker, Arlington, VA (US)

(73) Assignee: Henry Obermeyer, Wellington, CO (US)

( * ) Notice: Subject to any disclaimer, the term of this patent is extended or adjusted under 35 U.S.C. 154(b) by 0 days.

(21) Appl. No.: 16/322,185

(22) PCT Filed: Apr. 30, 2018

(86) PCT No.: PCT/US2018/030310
§ 371 (c)(1),
(2) Date: Jan. 31, 2019

(87) PCT Pub. No.: WO2019/005286
PCT Pub. Date: Jan. 3, 2019

(65) Prior Publication Data
US 2019/0186458 A1    Jun. 20, 2019

Related U.S. Application Data

(63) Continuation-in-part of application No. PCT/US2017/048769, filed on Aug. 26, 2017.
(Continued)

(51) Int. Cl.
*F03B 13/06* (2006.01)
*E02B 9/00* (2006.01)
(Continued)

(52) U.S. Cl.
CPC .............. *F03B 13/06* (2013.01); *E02B 9/00* (2013.01); *E02B 9/06* (2013.01); *F03B 3/103* (2013.01); *F03B 13/10* (2013.01); *F05B 2220/32* (2013.01)

(58) Field of Classification Search
CPC .. F03B 13/06; F03B 3/103; E02B 9/06; E02B 9/00; F05B 2220/32; Y02E 10/22; Y02E 10/226
(Continued)

(56) References Cited

U.S. PATENT DOCUMENTS

| | | | | |
|---|---|---|---|---|
| 1,757,926 A | * | 5/1930 | Moody | E02B 9/00 405/78 |
| 2,022,975 A | * | 12/1935 | Pfau | F03B 15/12 137/505.11 |

(Continued)

FOREIGN PATENT DOCUMENTS

| | | |
|---|---|---|
| CA | 1289869 | 10/1991 |
| CN | 103759069 A | 4/2014 |

(Continued)

OTHER PUBLICATIONS

International Application No. PCT/US2017/048769; International Search Report dated Nov. 20, 2017.
(Continued)

*Primary Examiner* — Dustin T Nguyen

(57) ABSTRACT

The present invention is a reversible pump-turbine installation positioned in a vertical borehole instead of in a conventional underground powerhouse or deep concrete powerhouse. The required plant cavitation coefficient may be achieved by simply boring a vertical borehole to the required depth rather than routing the water flow to and from a deeply buried powerhouse. A pneumatically controlled pressure relief valve may be incorporated into this invention.

6 Claims, 46 Drawing Sheets